(12) United States Patent
Seki

(10) Patent No.: US 11,497,031 B2
(45) Date of Patent: Nov. 8, 2022

(54) MASTER STATION DEVICE, SECONDARY STATION DEVICE, AND METHOD OF CONTROLLING COMMUNICATION

(71) Applicant: Panasonic Corporation, Osaka (JP)

(72) Inventor: Yuta Seki, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 19 days.

(21) Appl. No.: 17/122,865

(22) Filed: Dec. 15, 2020

(65) Prior Publication Data

US 2021/0212078 A1 Jul. 8, 2021

(30) Foreign Application Priority Data

Jan. 7, 2020 (JP) ............... JP2020-000863

(51) Int. Cl.
*H04W 72/08* (2009.01)
*H04W 88/08* (2009.01)

(52) U.S. Cl.
CPC .......... *H04W 72/085* (2013.01); *H04W 88/08* (2013.01)

(58) Field of Classification Search
CPC ............................ H04W 72/085; H04W 88/08
USPC ........................................................ 370/329
See application file for complete search history.

(56) References Cited

U.S. PATENT DOCUMENTS

2002/0136268 A1* 9/2002 Gan ...................... H04W 84/20
375/133
2014/0334417 A1 11/2014 Aminaka et al.
2016/0174128 A1* 6/2016 Oren .................... H04L 12/4633
370/328
2016/0337009 A1 11/2016 Kubo et al.
2020/0344635 A1* 10/2020 Lu ......................... H04W 88/10

FOREIGN PATENT DOCUMENTS

| JP | 2016-111637 A | 6/2016 |
|---|---|---|
| JP | 2018-170805 A | 11/2018 |
| WO | 2016/088820 A1 | 6/2016 |

OTHER PUBLICATIONS

3GPP TS 36.300 V15.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Dec. 2018, 363 pages.
3GPP TS 38.300 V15.4.0, "3rd Generation Partnership Project; Technical Specification Group Radio Access Network; NR; NR and NG-RAN Overall Description; Stage 2 (Release 15)," Dec. 2018, 97 pages.
CPRI Specification V7.0, "Common Public Radio Interface (CPRI); Interface Specification," Oct. 9, 2015, 128 pages.

(Continued)

*Primary Examiner* — Gbemileke J Onamuti
(74) *Attorney, Agent, or Firm* — Seed IP Law Group LLP

(57) ABSTRACT

A master station device connected to a secondary station device through a fronthaul includes a first base station signal processor having a first functional split configuration relating to a plurality of base station functional units for a first service type, and a second base station signal processor having a second functional split configuration relating to the plurality of base station functional units for a second service type.

13 Claims, 16 Drawing Sheets

(56) References Cited

OTHER PUBLICATIONS

ITU-T, "Series G: Transmission Systems and Media, Digital Systems and Networks—5G wireless fronthaul requirements in a passive optical network context," Supplement 66, Oct. 2018, 42 pages.
ECPRI Specification V2.0, "Common Public Radio Interface: eCPRI Interface Specification," May 10, 2019, 109 pages.

* cited by examiner

MASTER STATION DEVICE, SECONDARY STATION DEVICE, AND METHOD OF CONTROLLING COMMUNICATION

BACKGROUND

1. Technical Field

The present disclosure relates to a master station device, a secondary station device, and a method of controlling communication.

2. Background Art

In a radio communication system, in order to flexibly design an area where radio communication with a user terminal (user equipment, UE) is available, a configuration can be adopted in which a radio base station is split into a master station device and a secondary station device, and the secondary station device is disposed at a different position from the master station device.

For example, a master station device connected to a core network has a baseband signal processing function of the radio base station, and at least one secondary station device is connected to the master station device. The secondary station device performs radio processing such as analog conversion and performs radio communication with the UE.

SUMMARY

Non-limiting examples of the present disclosure contribute to providing a master station device, a secondary station device, and a method of controlling communication capable of efficiently reducing a volume of communication traffic between the master station device and the secondary station device.

A master station device according to one aspect of the present disclosure is connected to a secondary station device through a fronthaul, and the master station device includes: a first base station signal processor having a first functional split configuration relating to a plurality of base station functional units for a first service type; and a second base station signal processor having a second functional split configuration relating to the plurality of base station functional units for a second service type.

A secondary station device according to one aspect of the present disclosure is connected to a master station device through a fronthaul, and the secondary station device includes: a first base station signal processor having a first functional split configuration relating to a plurality of base station functional units for a first service type; and a second base station signal processor having a second functional split configuration relating to the plurality of base station functional units for a second service type.

A method of controlling communication according to one aspect of the present disclosure is a method by a master station device connected to a secondary station device through a fronthaul, the method including: obtaining information indicating transmission quality of the fronthaul; and determining transmission schemes through the fronthaul based on the information indicating the transmission quality of the fronthaul, one of the transmission schemes for a first base station signal processor and another of the transmission schemes for a second base station signal processor being determined separately, the first base station signal processor having a first functional split configuration relating to a plurality of base station functional units for a first service type, the second base station signal processor having a second functional split configuration relating to the plurality of base station functional units for a second service type.

A method of controlling communication according to one aspect of the present disclosure is a method by a secondary station device connected to a master station device through a fronthaul, the method includes: transmitting a signal for the master station device to measure transmission quality of the fronthaul; and determining transmission schemes through the fronthaul based on the information indicating the transmission quality of the fronthaul, one of the transmission schemes for a first base station signal processor and another of the transmission schemes for a second base station signal processor being determined separately, the first base station signal processor having a first functional split configuration relating to a plurality of base station functional units for a first service type, the second base station signal processor having a second functional split configuration relating to the plurality of base station functional units for a second service type.

Note that these comprehensive or specific aspects may be realized by a system, an apparatus, a method, an integrated circuit, a computer program, or a recording medium, or by a combination of any of a system, an apparatus, a method, an integrated circuit, a computer program, and a recording medium.

In one aspect of the present disclosure, the volume of communication traffic between the master station device and the secondary station device can be efficiently reduced.

Further advantages and effects of one aspect of the present disclosure will be apparent from the specification and drawings. Such advantages and/or effects are provided by some exemplary embodiments and the characteristics described in the specification and drawings, respectively, but all the advantages and/or effects do not have to be provided to obtain one or more of the same characteristics.

DETAILED DESCRIPTION OF PREFERRED EMBODIMENTS

Figure 1:
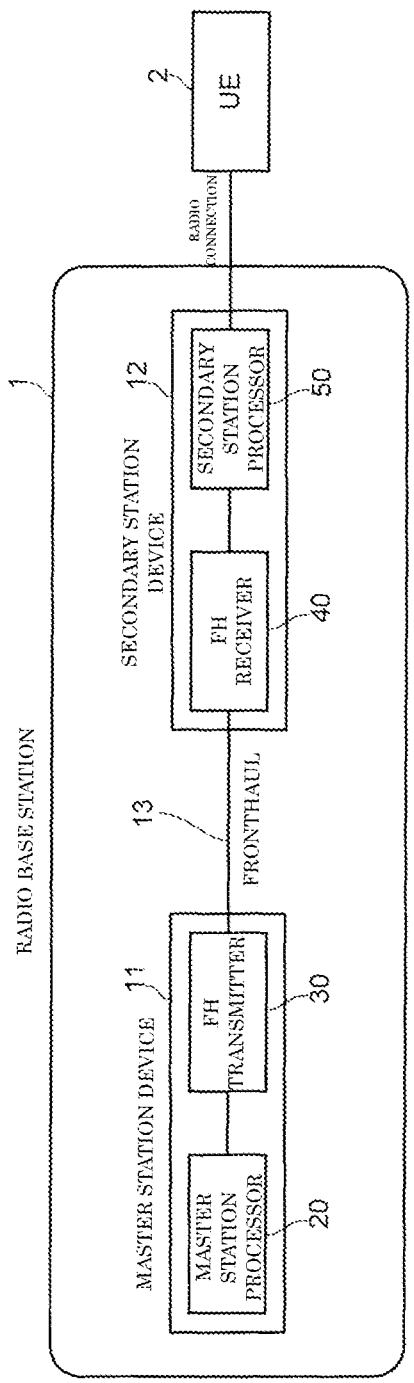
FIG. 1 is a diagram showing an example of a configuration of a radio communication system according to a first exemplary embodiment.

Before describing exemplary embodiments, problems in a conventional technique will be briefly described. In an existing radio communication system (for example, a radio base station), there is room for consideration regarding reduction in a volume of communication traffic between a master station device and a secondary station device.

Findings Leading to the Present Disclosure

In the existing technology (for example, Unexamined Japanese Patent Publication No. 2018-170805), the master station device may be referred to as baseband unit (BBU), and the secondary station device may be referred to as remote radio head (RRH). For a connection between the master station device and the secondary station device, for example, a wired transmitting means (or a wired interface) such as a coaxial cable, an unshielded twisted pair (UTP) cable, a shielded twisted pair (STP) cable, or an optical fiber cable is used. Such a connection between the master station device and the secondary station device may be referred to as a "fronthaul connection" or simply a "fronthaul".

In specifications regarding a communication method of the fronthaul (FH) (for example, Common Public Radio Interface (CPRI) Interface Specification V7.0 (2015 Oct. 9)), the master station device is called a radio equipment controller (REC) and the secondary station device is called radio equipment (RE).

As the radio communication becomes faster and its capacity becomes greater, the communication volume (for example, a data traffic volume) through the FH also increases. At such time, the FH communication band may become tight.

An example of countermeasures considered against the tightness of the FH band is changing, from a conventional configuration, a configuration in splitting (or separating) a plurality of base station functions to the master station device and the secondary station device so that the traffic volume of the FH is reduced (for example, Unexamined Japanese Patent Publication No. 2018-170805). A boundary at which the plurality of base station functions is split into the master station device and the secondary station device may be referred to as a "functional split point".

For example, instead of a functional split configuration in which the master station device is provided with a base station function of the up-conversion function and the amplification function, a functional split configuration in which the secondary station device is provided with an up-conversion function and an amplification function, for example, is considered. For example, the following functional split configuration is considered. The "functional split configuration" may be referred to as "functional split architecture".

Secondary station device
Buffer
Packet data convergence protocol (PDCP)
Radio link control (RLC)
Medium access control (MAC)
Encoding
Modulation
Resource mapping
Inverse fast Fourier transform (IFFT)
Up-conversion
Master station device
Bearer termination function As a process proceeds closer to transmission, a data header and redundancy increase, thereby increasing a data volume. By increasing the number of functions disposed in the secondary station device rather than in the master station device as described above, the communication volume from the master station device to the secondary station device, that is, the FH communication volume can be reduced. In the Common Public Radio Interface: eCPRI Interface Specification V2.0 (2019 May 10), it is also considered to change the functional split between the master station device and the secondary station device.

It is also considered to split control data and user data and to apply different functional splits of the master station device and the secondary station device to each data (for example, International Publication No. 2016/088820). For the user data, which tends to have a larger data volume than the control data, the FH communication volume can be reduced by arranging more functions in the master station device.

In addition, a method of changing a user allocation and resource allocation of radio communication in accordance with the available FH band is also considered (for example, Unexamined Japanese Patent Publication No. 2016-111637). For example, by preparing some patterns related to the user allocation and resource allocation of the radio communication and applying a pattern that fits in the FH band, the FH band can be prevented from being tight.

However, applying a pattern that fits in the FH band in this way imposes a limit to the FH band, which may lead to a reduction in system performance. Further, when the functional split configuration of the master station device and the secondary station device is changed, the system performance may differ depending on the functional split configuration. Therefore, the system performance may not be optimized for a service type of the data to be sent.

For example, a MAC function determines and controls a transmission scheme in radio transmission in accordance with channel quality information (for example, channel quality indicator, CQI) fed back from a user equipment (UE). The transmission scheme in the radio transmission may include determination of modulation and coding scheme (MCS), in other words, determination of transmission parameters such as a coding rate and a modulation multilevel number. In addition, the MAC function performs retransmission control called a hybrid automatic repeat request (HARQ) in accordance with, for example, acknowledgment (Ack/Nack) information fed back from the UE.

The MAC function, responsible for such control, disposed in the master station device allows for, for example, a coordinated operation between a plurality of different secondary station devices connected to the master station device. This can improve a signal-to-interference plus noise power ratio (SINR) in a radio communication section. Communication by such a coordinated operation is called coordinated multiple-point (CoMP) communication or antenna coordination.

Meanwhile, the MAC function disposed in the secondary station device can realize, for example, the retransmission control by the HARQ without the FH (for example, optical transmission section) in between, and reduce round trip time (RTT) by round trip time of the FH, thereby reducing a delay.

A difference in the system performance due to a difference in the functional split configuration has not been considered or examined. Thus, it has not been considered or examined that the performance or capability of FH transmission differs depending on the functional split configuration when the plurality of different functional split configurations is adopted in a radio base station.

For example, a type of signal (for example, data) flowing through the FH (in other words, which base station function output flows) may differ depending on the difference in the functional split configurations of the master station device and the secondary station device. Different types of data flowing through the FH have different suitable or optimal ways of FH transmission, and thus the data may have excessive redundancy in FH transmission, for example.

Summary of the Present Disclosure

Based on the above findings, the following techniques will be described in the present disclosure, for example.

(1) The functional split configurations of the base station devices (master station device and secondary station device) is made different depending on the service type.

(2) The transmission scheme through the fronthaul between the master station device and the secondary station device is controlled in accordance with the functional split configuration (for example, is made different). Controlling the transmission scheme in FH transmission may include, for example, determining or controlling at least one of the error correction code, the coding rate, or the modulation scheme.

(3) Transmission quality in the FH transmission is given (for example, fed back) to the master station device.

(4) The master station device controls the radio transmission scheme based on information on radio transmission quality and information on the service type and the FH transmission quality. Controlling the radio transmission scheme may include, for example, determining or controlling at least one of the error correction code, the coding rate, or the modulation scheme.

(5) In the FH transmission, signal redundancy is reduced by allowing deterioration of signal quality (in other words, allowing data loss to occur in the FH transmission, for example). By reducing the signal redundancy in the FH transmission, a traffic amount of the FH transmission can be reduced. In the control of the radio transmission scheme in (4), the transmission quality as a radio communication system (hereinafter, may be simply abbreviated as "system") can be guaranteed by considering or examining a signal distortion allowed for the FH transmission.

Hereinafter, exemplary embodiments will be described with reference to the drawings. Note that a more detailed description than needed may be omitted. For example, a detailed description of well-known matters and a redundant description of substantially the same configuration may be omitted. This is to avoid an unnecessarily wordy description and to facilitate understanding of those skilled in the art.

Note that the attached drawings and the following description are provided for those skilled in the art to fully understand the present disclosure, and are not intended to limit the subject matter as described in the appended claims.

First Exemplary Embodiment

FIG. 1 is a diagram showing an example of a configuration of a radio communication system according to a first exemplary embodiment. As illustrated in FIG. 1, the radio communication system includes, for example, radio base station 1 and UE 2, which is an example of a terminal device. The number of radio base stations 1 and the number of UE 2 may be more than or equal to two.

UE 2 communicates by radio communication to radio base station 1. Radio communication between UE 2 and radio base station 1 includes at least one of uplink (UL) communication or downlink (DL) communication. Hereinafter, an example of a configuration and operation focusing on the DL of radio base station 1 will be described. An example focusing on the UL will be described later in fourth to sixth exemplary embodiments (FIGS. 12 to 16).

Radio base station 1 includes, for example, master station device 11 and secondary station device 12 that are interconnected by FH 13. Master station device 11 may be referred to as, for example, BBU, centralized baseband unit (CBBU), REC, or central unit (CU). Secondary station device 12 may be referred to as, for example, RRH, RE, or distributed unit (DU). One master station device can be connected to two or more secondary station devices. Further, one secondary station device can be connected to two or more UEs.

By way of example, a wired transmitting means (or the wired interface) such as a UTP cable, an STP cable, or an optical fiber cable may be applied to FH 13. Wired interfaces may be interfaces that comply with standards or technologies such as common public radio interface (CPRI), evolved CPRI (eCPRI), open base station architecture initiative (OBSAI), radio over Ethernet (RoE), and radio over fiber (RoF). "Ethernet" is a registered trademark.

<Master Station Device 11>

Figure 2:
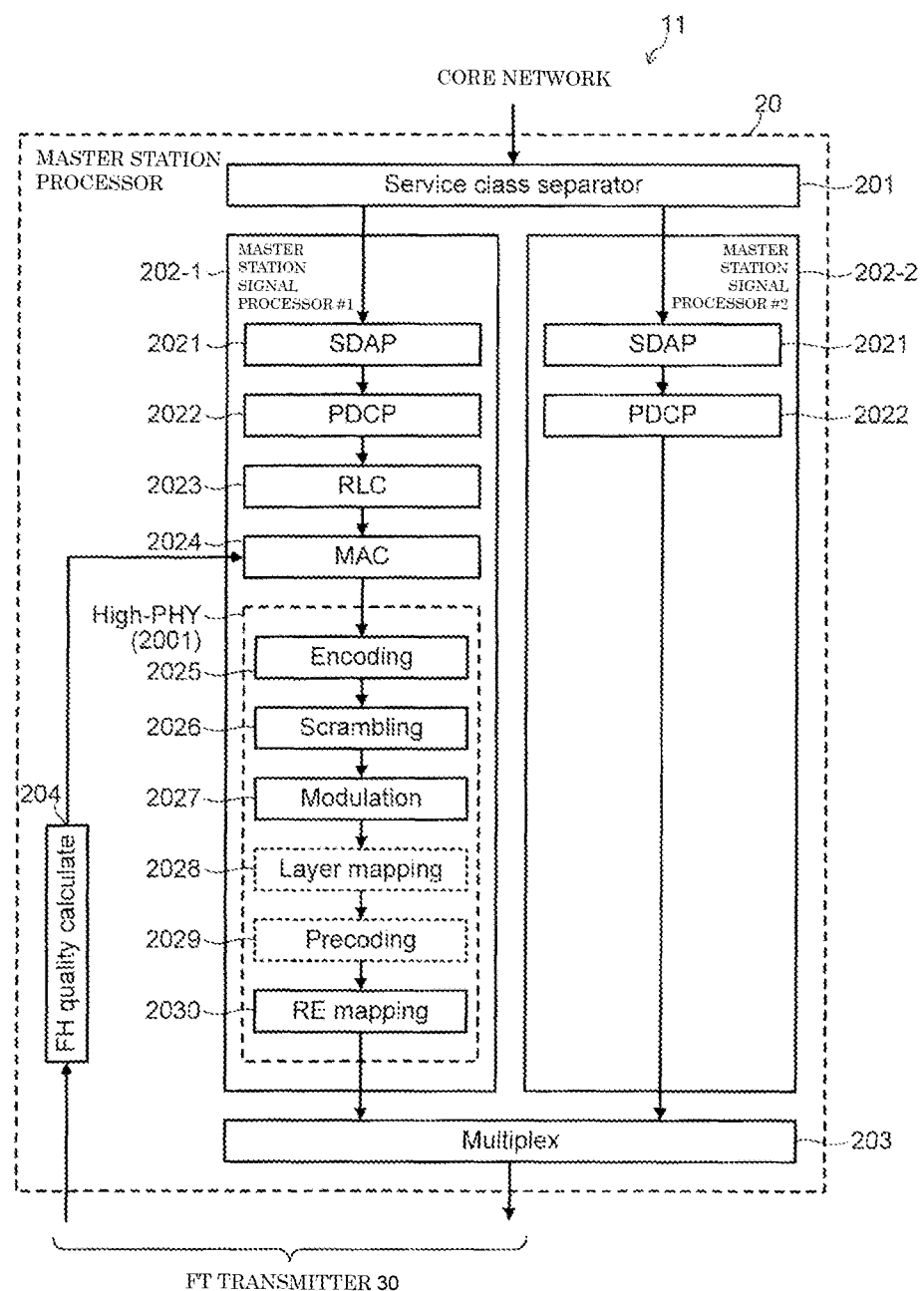
FIG. 2 is a block diagram showing an example of a configuration of a master station processor according to the first exemplary embodiment.
Figure 3:
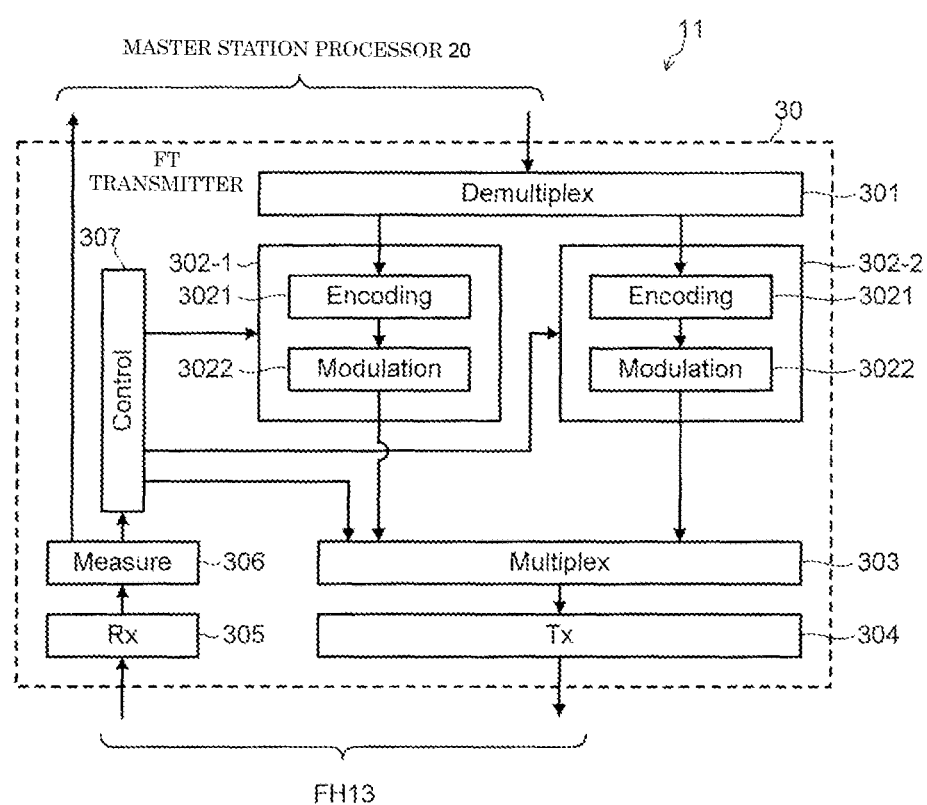
FIG. 3 is a block diagram showing an example of a configuration of a fronthaul (FH) transmitter according to the first exemplary embodiment.
Figure 4:
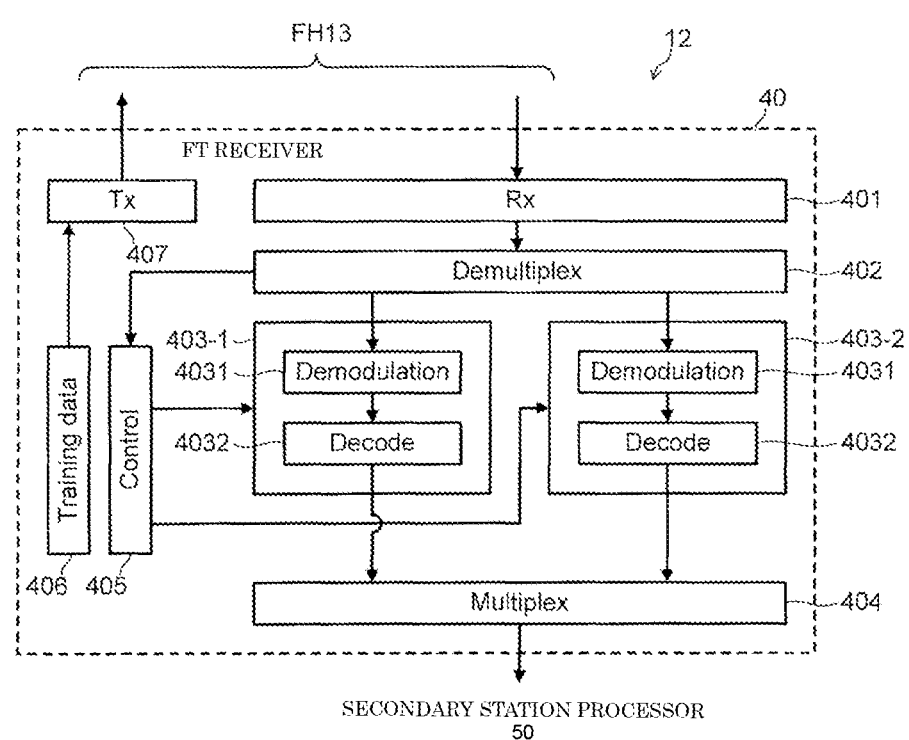
FIG. 4 is a block diagram showing an example of a configuration of an FH receiver according to the first exemplary embodiment.
Figure 5:
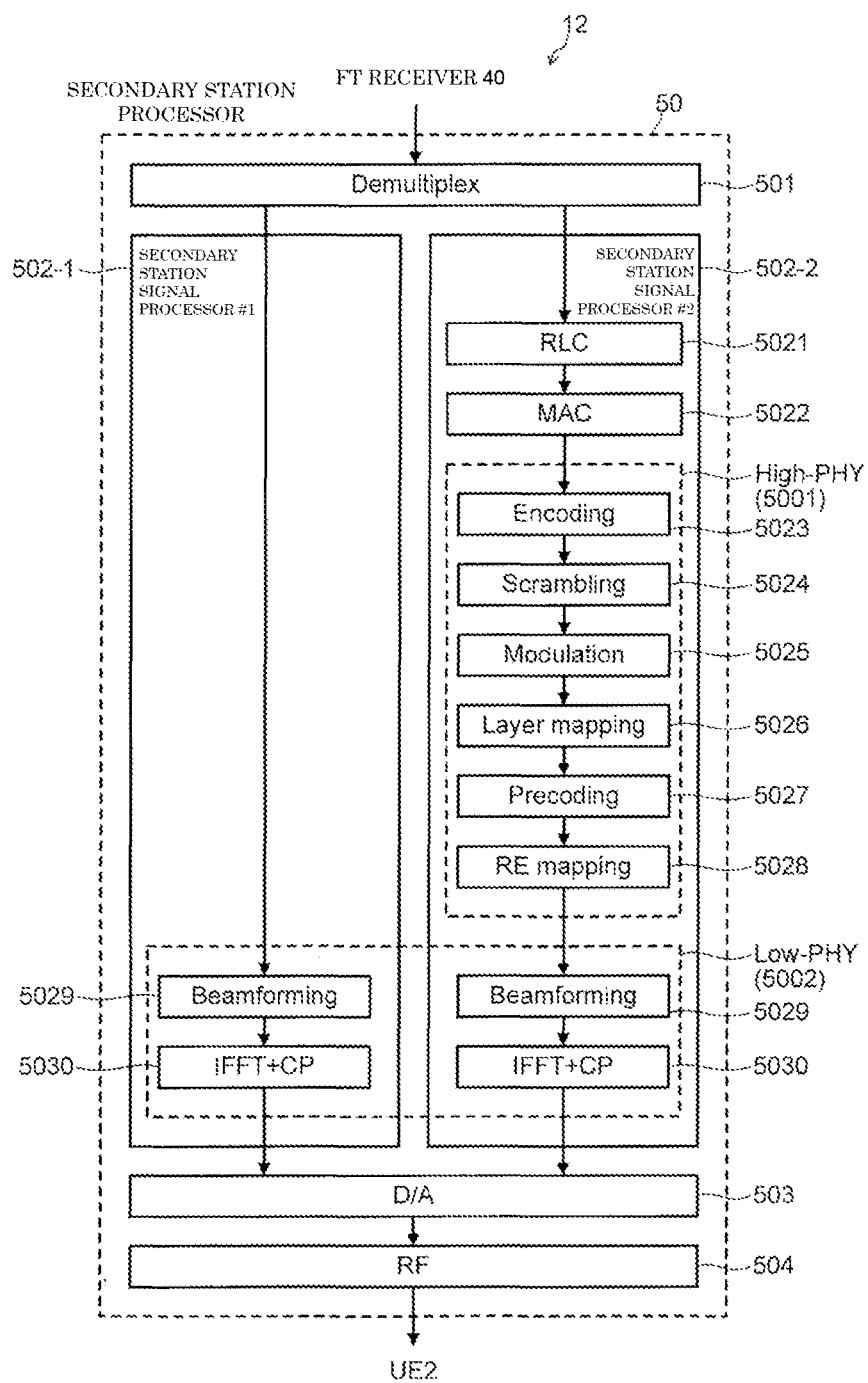
FIG. 5 is a block diagram showing an example of a configuration of a secondary station processor according to the first exemplary embodiment.

Master station device 11 includes, for example, master station processor 20 and FH transmitter 30, and secondary station device 12 includes FH receiver 40 and secondary station processor 50. FIG. 2 shows an example of a configuration of master station processor 20, and FIG. 3 shows an example of a configuration of FH transmitter 30. Further, FIG. 4 shows an example of a configuration of FH receiver 40, and FIG. 5 shows an example of a configuration of secondary station processor 50.

(Master Station Processor 20)

As illustrated in FIG. 2, master station processor 20 includes service class separator 201, master station signal processors 202-1 and 202-2, multiplexer 203, and FH quality calculator 204.

Master station signal processors 202-1 and 202-2 may be referred to as master station signal processors 202 #1 and 202 #2, respectively. Master station signal processors 202-1 and 202-2 may be referred to as master station signal processor 202 when they are not distinguished from each other. The number of master station signal processors 202 provided in master station processor 20 is not limited to two, and may be three or more. For example, where N is an integer of two or more, N master station signal processors 202 may be described as master station signal processor 202 #j (j=1 to N). Note that N may be regarded as corresponding to the number of service types.

For example, service class separator 201 splits signals (for example, user data) transmitted from a higher-level core network (for example, EPC or 5GC) for each service type. "EPC" is an abbreviation for "evolved packet core", and 5GC is an abbreviation for "fifth generation (5G) core network".

The term 5G stands for fifth generation radio access technology (RAT) and is sometimes referred to as new radio (NR). Further, 5GC is sometimes referred to as next generation core network (NGC).

A disposition position of service class separator 201 illustrated in FIG. 2 is not limited to a position shown in FIG. 2 (before SDAP unit 2021). For example, service class separator 201 may be disposed after SDAP unit 2021 or PDCP unit 2022, which will be described later.

Non-limiting examples of service types include high-speed and large-capacity enhanced mobile broadband (eMBB), ultra-reliable and low latency communications (URLLC), and massive machine type communication (mMTC), which are listed as 5G requirements. The user data may be split (or classified) in accordance with these service types.

The user data may be additionally or alternatively classified by quality of service (QoS) parameters defined for each data flow. The QoS parameter may include, for example, at least any one of allocation and retention priority (ARP), guaranteed bit rate (GBR), maximum bit rate (MBR), or 5G QoS identifier (5QI).

The user data may be additionally or alternatively classified by different application services.

As illustrated in FIG. 2, master station signal processor 202 #1 corresponding to service type #1 includes, for example, service data adaptation protocol (SDAP) unit 2021, packet data convergence protocol (PDCP) unit 2022, and radio link control (RLC) unit 2023, and MAC unit 2024. Further, master station signal processor 202 #1 includes, for example, encoder 2025, scrambling unit 2026, modulator 2027, layer mapping unit 2028, precoder 2029, and resource element (RE) mapping unit 2030.

These functional units 2021 to 2030, together with functional units 5029 and 5030 in secondary station signal processor 502 #1 described later with reference to FIG. 5, are a non-limiting example of a plurality of base station functional units provided in radio base station 1. Encoder 2025, scrambling unit 2026, modulator 2027, layer mapping unit 2028, precoder 2029, RE mapping unit 2030 form higher physical layer (High-PHY) block 2001.

For example, SDAP unit 2021 maps a QoS flow and a radio bearer, adds an SDAP header to a packet sent from the higher-level core network, and outputs the packet to PDCP unit 2022.

PDCP unit 2022 performs processing such as encoding of the user data and header compression on an output of the SDAP unit 2021, and outputs a PDCP protocol data unit (PDU) to RLC unit 2023.

RLC unit 2023 performs processing such as error detection and retransmission control by ARQ on an output of PDCP unit 2022, and outputs an RLC PDU.

MAC unit 2024 controls retransmission by the HARQ, determines UE 2 to which communication opportunity is allocated by scheduling, determines MCS in the radio transmission, generates a MAC PDU from the RLC PDU, and outputs a transport block.

The CQI fed back from UE 2 may be used to determine the MCS. In the present disclosure, MAC unit 2024 determines the MCS based on, for example, the CQI, communication quality required for each service type, and FH transmission quality information input from FH quality calculator 204.

FH quality calculator (or FH quality determiner) 204 determines the FH transmission quality information based on the information on the FH transmission quality measured as described later. The FH transmission quality information is an example of a signal quality index of an FH transmission section. As a non-limiting example, a signal-to-noise power (SN) ratio may be used for the FH transmission quality information.

The FH transmission quality information is input to, for example, MAC unit 2024 in at least one master station signal processor 202 #1. In addition, the FH transmission quality information may be input to MAC unit 2024 in another master station signal processor 202 #j (for example, j=2) different from master station signal processor 202 #1.

For example, MAC unit 2024 calculates transmission quality of a propagation path integrating an FH propagation path and a radio propagation path, based on radio quality information indicated by the CQI fed back from UE 2 and the FH transmission quality information. Then, MAC unit 2024 determines the MCS such that, for example, the transmission quality when the data propagates through the integrated propagation path satisfies required quality according to the service type.

As a non-limiting example, MAC unit 2024 combines the SN ratio of a radio transmission section and the SN ratio of the FH transmission section. MAC unit 2024 determines the MCS suitable for the integrated propagation path including the radio transmission section and the FH transmission section based on the combined SN ratio.

By allowing the deterioration of the signal quality in the FH transmission within a range where signal interruption does not occur, the redundancy of the signal in the FH transmission can be reduced, and a traffic volume in the FH transmission can be reduced. For example, in order to reduce the traffic volume of the FH transmission, a parameter that deteriorates the signal quality is allowed to be selected as a transmission parameter of the FH transmission.

In this case, in determining the MCS described above (in other words, controlling the radio transmission scheme), by selecting an MCS capable of compensating for the signal quality deterioration allowed for the FH transmission, the transmission quality as the radio communication system (hereinafter, sometimes abbreviated simply as "system") can be guaranteed.

Then, MAC unit 2024 outputs control information such as information on the determined MCS and resources used for the radio transmission (for example, resource element (RE) information) to High-PHY block 2001 after MAC unit 2024.

In High-PHY block 2001, encoder 2025 adds a cyclic redundancy check (CRC) code to the transport block input from MAC unit 2024, for example, and splits the transport block into code blocks. Further, encoder 2025 performs, for example, encoding of the code block and rate matching corresponding to the MCS.

Scrambling unit 2026, for example, performs scrambling processing on output of encoder 2025.

Modulator 2027 modulates an output of scrambling unit 2026 by a modulation scheme such as quadrature phase shift keying (QPSK), 16 quadrature amplitude modulation (QAM), 64QAM, or 256QAM.

Layer mapping unit 2028 maps an output of modulator 2027 to a plurality of layers, for example.

Precoder 2029 precodes an output of layer mapping unit 2028, for example.

RE mapping unit 2030 maps, for example, an output of precoder 2029 to a predetermined radio resource (for example, RE). One RE is, for example, a radio resource area with one sub-carrier and one symbol. A resource block (RB) may be configured by one or a plurality of REs. The one or plurality of RBs can be referred to as other terms such as physical RB (PRB), sub-carrier group (SCG), resource element group (REG: RE group), PRB pair, and RB pair.

Layer mapping unit 2028 and precoder 2029, which are used for multiple-input and multiple-output (MIMO) transmission, may be omitted when the MIMO transmission is not applied. Further, the control information for the UE to demodulate and decode a user data signal is multiplexed with the user data signal and transmitted from radio base station 1 to UE 2 (not shown). For example, the user data signal is transmitted by a physical downlink shared channel (PDSCH), and the control information is transmitted by a physical downlink control channel (PDCCH). The PDSCH and the PDCCH are subjected to time division multiplexing and radio communication by different orthogonal frequency division multiple access (OFDM) symbols.

Next, an example of a configuration of master station signal processor 202 #2 will be described. As illustrated in FIG. 2, master station signal processor 202 #2 includes SDAP unit 2021 and PDCP unit 2022. Functions of SDAP unit 2021 and PDCP unit 2022 may be the same as or similar to those in master station signal processor 202 #1.

In other words, RLC unit 2023, MAC unit 2024, encoder 2025, scrambling unit 2026, modulator 2027, layer mapping unit 2028, precoder 2029, and RE mapping unit 2030 are not disposed in master station signal processor 202 #2. The functional units corresponding to functional units 2023 to 2030 are disposed in secondary station processor 50 (secondary station signal processor 502 #2), as will be described later with reference to FIG. 5.

Thus, master station signal processor 202 #2 has a different functional split configuration from master station signal processor 202 #1. In other words, master station signal processor 202 #1 and master station signal processor 202 #2 have different functional split points related to the base station function, or master station signal processor 202 #1 and master station signal processor 202 #2 have different mapping of the plurality of functional units.

Next, in FIG. 2, multiplexer 203 multiplexes the outputs of the plurality of different master station signal processors 202 #1 and 202 #2. A multiplex signal is output to FH transmitter 30 having the configuration illustrated in FIG. 3. Time division multiplexing (TDM), frequency division multiplexing (FDM), code division multiplexing (CDM), or wavelength division multiplexing (WDM) may be applied to a multiplexing scheme in multiplexer 203 as a non-limiting example.

In multiplexer 203, information for identifying the output signal of master station signal processor 202 #j (for example, signal ID #j) may be assigned. For example, a signal ID may be assigned to each of the output signals of master station signal processor 202 #j. Further, for example, time slot information for TDM, frequency information for FDM, and wavelength information for WDM may each serve as the signal ID.

Further, multiplexer 203 may be omitted. For example, the outputs of the plurality of different master station signal processors 202 #1 and #2 may be physically separated and input to FH transmitter 30.

Further, master station signal processor 202 #1 and master station signal processor 202 #2 may be realized by physically different devices, or may be logically realized by being split in the same device using, for example, virtualization technology. The logically split configuration may be referred to as a "slice".

Further, the number of master station signal processors 202 #j may be two or more as described above, and may be changed dynamically or adaptively for the logical split. For example, when the service type supported by radio base station 1 changes, a configuration suitable for the service type can be realized by increasing or decreasing the number of slices in accordance with the change of the service type.

For example, in radio base station 1, slices suitable for the supported service types, such as slices for the eMBB, slices for the URLLC, and slices for the mMTC, can be added or deleted as needed. This makes it possible to flexibly realize a base station configuration suitable for the service type.

Alternatively, depending on the service type, the configuration of master station signal processor 202 #2 may be realized by omitting a part of the processing of master station signal processor 202 #1. In other words, the plurality of master station signal processors 202 may be realized by omitting or skipping a part of the processing by the plurality of functional units forming one master station signal processor 202. This point also applies to the second to fourth exemplary embodiments described later.

When presence or absence of MAC unit 2024 is considered, master station device 11 having the configuration described with reference to FIG. 2 is configured such that master station signal processor 202 #1 includes MAC unit 2024, and master station signal processor 202 #2 does not include MAC unit 2024.

An FH transmission with less redundancy than master station signal processor 202 #2 can be applied (or set) to master station signal processor 202 #1 including MAC unit 2024. On the other hand, master station signal processor 202 #2, which does not include MAC unit 2024, can be applied (or set) with a more redundant FH transmission, in other words, a more robust FH transmission.

As described above, in the first exemplary embodiment, the appropriate FH transmission according to the difference in the functional split configurations of master station signal processors 202 #1 and 202 #2 can be individually applied to master station signal processors 202 #1 and 202 #2. In other words, the first exemplary embodiment allows the FH transmission to be appropriate or optimized according to service type #j. It is therefore possible to prevent excessive redundancy from being applied to the signal transmitted through FH 13 in either master station signal processor 202 #1 or 202 #2, for example.

(FH Transmitter 30)

Next, an example of a configuration of FH transmitter 30 will be described with reference to FIG. 3. As illustrated in FIG. 3, FH transmitter 30 includes, for example, demultiplexer 301, FH transmission processors 302-1 and 302-2 corresponding to the service types, multiplexer 303, and transmitter (Tx) 304, receiver (Rx) 305, measurement unit 306, and controller 307.

FH transmission processors 302-1 and 302-2 may be referred to as FH transmission processors 302 #1 and 302 #2, respectively. Further, FH transmission processors 302-1 and 302-2, which are not distinguished from each other, may be referred to as FH transmission processor 302. The number of FH transmission processors 302 provided in FH transmitter 30 is not limited to two, and may be three or more. For example, N of FH transmission processors 302 corresponding to the number N of service types may be referred to as FH transmission processor 302 #j (j=1 to N).

FH transmission processor 302 #1 and FH transmission processor 302 #2 may be realized by physically different devices, or may be realized by being split by software or hardware circuits in the same device, for example.

For example, demultiplexer 301 individually separates the signal received from FH 13 into different master station signal processors 202 #j. When the signal received from FH 13 is a multiplex signal, demultiplexer 301 identifies and separates the received signal for each master station signal processor 202 #j based on, for example, the signal ID described above.

Receiver 305 receives, for example, a known signal (for example, a training signal) transmitted from secondary station device 12 (for example, FH receiver 40 described later in FIG. 4) and propagated through FH 13, and outputs the known signal to measurement unit 306.

Measurement unit 306 measures reception quality of the known signal input from receiver 305, and outputs the quality measurement result to, for example, controller 307.

Based on the quality measurement result by measurement unit 306, controller 307 determines an FH transmission parameter (for example, at least one of a code type, a coding rate, or a modulation multilevel number) #j corresponding to each of master station signal processors 202 #j, and outputs the FH transmission parameter to FH transmission processors 302 #1 and 302 #2.

Controller 307 may encode and modulate the control information addressed to secondary station device 12 and output the control information to multiplexer 303, for example. The control information may include, for example, the determined FH transmission parameter. The quality measurement result by measurement unit 306 may be additionally or alternatively included in the control information.

Each of FH transmission processors 302 #1 and 302 #2 includes, for example, encoder 3021 and modulator 3022.

For example, encoder 3021 encodes the signal separated and output by demultiplexer 301 according to FH transmission parameter #j from controller 307 for the signal corresponding to master station signal processor 202 #j.

For example, modulator 3022 modulates the output of encoder 3021 by a modulation scheme (for example, any of QPSK, 16QAM, 64QAM, or 256QAM) in accordance with FH transmission parameter #j from controller 307.

For example, multiplexer 303 multiplexes signals of the plurality of different FH transmission processors 302 #j and the control information from controller 307 and outputs the signals and the control information to transmitter 304. Any of TDM, FDM, CDM, or WDM may be applied to the multiplexing scheme in multiplexer 303 as a non-limiting example.

In multiplexer 303, information for identifying the output signal of master station signal processor 202 #j (for example, signal ID #j) may be assigned. For example, a signal ID may be assigned to each of the output signals of master station signal processor 202 #j. Further, for example, the time slot information for TDM, the frequency information for FDM, the coding information for CDM, and the wavelength information for WDM may each serve as a signal ID.

Transmitter 304 performs transmission processing according to a wired transmitting means (or a wired interface) such as a UTP cable, an STP cable, or an optical fiber cable on the output of multiplexer 303, and transmits the output to FH 13.

Measurement unit 306 of FH transmitter 30 may include a function of FH quality calculator 204 (see FIG. 2) of master station processor 20. In that case, master station processor 20 does not have to be provided with FH quality calculator 204.

Further, FH quality calculator 204 of master station processor 20 and controller 307 of FH transmitter 30 may be integrally configured as one controller. For example, one of the functions of FH quality calculator 204 and controller 307 may be included in the other function of FH quality calculator 204 and controller 307. Further, measurement unit 306 of FH transmitter 30 may be included in controller 307.

In other words, it is sufficient that the functions of FH quality calculator 204, measurement unit 306, and controller 307 are provided in master station device 11.

Further, FH transmitter 30 may be realized in physically same device 20 as master station processor 20. In this case, for example, multiplexer 203 and demultiplexer 301 may not be required. For example, the signals of different master station signal processors 202 #j corresponding to the service types may be processed in parallel in one device 20.

<Secondary Station Device 12>

Next, an example of a configuration of secondary station device 12 will be described.

(FH Receiver 40)

FIG. 4 is a block diagram showing an example of a configuration of FH receiver 40.

As illustrated in FIG. 4, FH receiver 40 includes, for example, receiver 401, demultiplexer 402, FH reception processors 403-1 and 403-2 corresponding to master station signal processors 202 #1 and #2 (in other words, a plurality of service types #1 and #2), multiplexer 404, controller 405, training data unit 406, and transmitter 407.

FH reception processors 403-1 and 403-2 may be referred to as FH reception processors 403 #1 and 403 #2, respectively. FH reception processors 403-1 and 403-2, which are not distinguished from each other, may be referred to as FH reception processor 403. The number of FH reception processors 403 provided in FH receiver 40 is not limited to two, and may be three or more. For example, N FH reception processors 403 corresponding to the number N of service types may be referred to as FH reception processor 403 #j (j=1 to N).

FH reception processor 403 #1 and FH reception processor 403 #2 may be realized by physically different devices, or may be realized by being split by software or hardware circuits in the same device, for example.

For example, receiver 401 performs reception processing according to a wired transmitting means (or a wired interface) such as a UTP cable, an STP cable, and an optical fiber cable on a signal received from FH 13, and outputs the signal to demultiplexer 402.

Demultiplexer 402 separates signals corresponding to a plurality of different master station signal processors 202 #j from the output of receiver 401, for example, based on the above signal ID, and outputs the signal to FH reception processors 403 #j. Further, demultiplexer 402 separates the control information multiplexed by FH transmitter 30 from the output of receiver 401, for example, and outputs the control information to controller 405.

Controller 405 decodes the control information input from demultiplexer 402 (for example, FH transmission parameter #j corresponding to each of master station signal processors 202 #j) and outputs the control information to FH reception processors 403 #j.

Each of FH reception processors 403 #j includes demodulator 4031 and a decoder 4032.

Demodulator 4031 demodulates the output of demultiplexer 402 in accordance with, for example, the control information (for example, FH transmission parameter #j) from controller 405.

Decoder 4032 decodes the output of demodulator 4031 in accordance with, for example, the control information (for example, FH transmission parameter #j) from controller 405.

Multiplexer 404 multiplexes outputs of the plurality of different FH reception processors 403 #j and outputs the multiplexed output to secondary station processor 50, for example. The signal multiplexed in multiplexer 404 corresponds to a signal addressed to the plurality of different secondary station signal processors (for example, secondary station signal processors 502 #1 and 502 #2 described later in FIG. 5) in secondary station processor 50.

Note that TDM, FDM, CDM, or WDM may be applied to the multiplexing scheme in multiplexer 404 as a non-limiting example. In multiplexer 404, information for identifying the output signal of FH reception processor 403 #j (for example, signal ID #j) may be assigned. For example, a signal ID may be assigned to each of the output signals of FH reception processor 403 #j. Further, for example, time slot information for TDM, frequency information for FDM, and wavelength information for WDM may each serve as the signal ID.

Further, multiplexer 404 may be omitted. For example, the outputs of the plurality of different FH reception processors 403 #1 and 403 #2 may be physically separated and input to secondary station processor 50.

Training data unit 406 generates, for example, a known signal for measuring the transmission quality of FH 13 and outputs the known signal to transmitter 407. The "known signal" is, for example, a training signal (or data) used by designating a predetermined sequence between a transmitter and a receiver in advance. The training signal may be read as another name such as a pilot signal or a reference signal.

Transmitter 407 transmits, for example, the training signal to FH 13 connected to master station device 11 (for example, FH transmitter 30). The training signal transmitted to FH 13 is received, for example, by receiver 305 (see FIG. 3) of FH transmitter 30 in master station device 11.

Alternatively, transmission quality measurement of FH 13 using the known signal may be performed by FH transmitter 30 transmitting the known signal to FH receiver 40, FH receiver 40 measuring the transmission quality of FH 13, and feeding back the measurement result to FH transmitter 30.

Note that a part or all of controller 405, training data unit 406, and transmitter 407 do not have to be provided inside FH receiver 40, but have only to be provided inside secondary station device 12.

(Secondary Station Processor 50)

Next, an example of a configuration of secondary station processor 50 will be described with reference to FIG. 5.

As illustrated in FIG. 5, secondary station processor 50 includes, for example, demultiplexer 501, secondary station signal processors 502-1 and 502-2, digital to analog (D/A) converter 503, and radio frequency (RF) unit 504.

Secondary station signal processors 502-1 and 502-2 may be referred to as secondary station signal processors 502 #1 and 502 #2, respectively. Further, secondary station signal processors 502-1 and 502-2, which are not distinguished from each other, may be referred to as secondary station signal processor 502. The number of secondary station signal processors 502 provided in secondary station processor 50 is not limited to two, and may be three or more. For example, N secondary station signal processors 502 corresponding to the number N of service types may be referred to as secondary station signal processor 502 #j (j=1 to N).

Secondary station signal processor 502 #1 and secondary station signal processor 502 #2 may be realized by physically different devices, or may be realized by being split into logical slices, for example.

For example, demultiplexer 501 separates signals addressed to the plurality of different secondary station signal processors 502 #j based on the signal ID described above, and outputs the separated signals to corresponding secondary station signal processor 502 #j.

As described in FIG. 2, as master station signal processors 202-1 and 202-2 have different functional split configurations (in other words, different functional split points), secondary station signal processors 502-1 and 502-2 have different functional split configurations.

For example, secondary station signal processor 502-1 includes beamforming unit 5029 and IFFT+cyclic prefix (CP) unit 5030 depending on the functional split point of master station signal processor 202-1 corresponding to service type #1.

Meanwhile, secondary station signal processor 502-2 includes, for example, RLC unit 5021, MAC unit 5022, encoder 5023, scrambling unit 5024, modulator 5025, layer mapping unit 5026, precoder 5027, RE mapping unit 5028, beamforming unit 5029, and IFFT+CP unit 5030 depending on the functional split point in master station signal processor 202-2 corresponding to service type #2.

In secondary station signal processor 502-1, beamforming unit 5029 and IFFT+CP unit 5030 form, for example, lower physical layer (Low-PHY) block 5002.

Beamforming unit 5029 of secondary station signal processor 502-1 performs beam forming processing on the output of demultiplexer 501, for example.

IFFT+CP unit 5030 of secondary station signal processor 502-1 inserts the IFFT and CP into the output of beamforming unit 5029, for example.

Meanwhile, in secondary station signal processor 502-2, functional units 5021 to 5028 form, for example, High-PHY block 5001. Further, in secondary station signal processor 502-2, beamforming unit 5029 and IFFT+CP unit 5030 form, for example, Low-PHY block 5002.

Functional units 5021 to 5028 of secondary station signal processor 502-2 may be regarded as similar to functional units 2023 to 2030 (see FIG. 2) of master station signal processor 202-1, respectively.

Beamforming unit 5029 of secondary station signal processor 502-2 performs beam forming processing on output of RE mapping unit 5028, for example.

IFFT+CP unit 5030 of secondary station signal processor 502-2 inserts the IFFT and CP into, for example, the output of beamforming unit 5029 of secondary station signal processor 502-2.

D/A converter 503 converts, for example, the output of secondary station signal processors 502 #1 and 502 #2 (outputs of two IFFT+CP units 5030) from digital signals to analog signals.

For example, RF unit 504 performs transmission RF processing such as up-conversion processing to a radio frequency and amplification processing on the output of D/A converter 503. A radio signal generated by the transmission RF processing is radiated into a space (for example, transmitted to UE 2) via an antenna (not shown) provided in RF unit 504, for example.

Low-PHY block 5002 may be individually provided for or shared by secondary station signal processors 502 #1 and 502 #2. When Low-PHY block 5002 is shared by secondary station signal processors 502 #1 and 502 #2, the processing of the plurality of different secondary station signal processors 502 may be executed in parallel in one Low-PHY block 5002.

Further, FH receiver 40 described in FIG. 4 may be realized in physically same device 50 as secondary station processor 50. In this case, for example, multiplexer 404 and demultiplexer 501 are not to be provided. For example, the signals of different secondary station signal processors 502 #j corresponding to service type #j may be processed in parallel in one device.

Further, secondary station signal processor 502 #1 and secondary station signal processor 502 #2 may be realized by physically different devices, or may be logically realized by being split in the same device using, for example, virtualization technology.

Further, the number of secondary station signal processors 502 #j may be two or more, and may be changed dynamically or adaptively for the logical split. For example, as described above, when the service type supported by radio base station 1 changes, as the number of slices #j corresponding to master station signal processor 202 #j increases and decreases, the number of slices #j corresponding to secondary station signal processor 502 #j may also increase and decrease.

Further, one or both of D/A converter 503 and RF unit 504 illustrated in FIG. 5 may be individually provided for the plurality of different secondary station signal processors 502 #j.

Further, at least one of master station processor 20 and secondary station processor 50 may include logical slices. Further, at least one of master station device 11 and secondary station device 12 may include logical slices.

Alternatively, depending on the service type, the configuration of secondary station signal processor 502 #2 may be realized by omitting a part of the processing of secondary station signal processor 502 #1. In other words, the plurality of secondary station signal processors 502 may be realized by omitting or skipping a part of the processing by the plurality of functional units forming one secondary station signal processor 502. This point also applies to the second to fourth exemplary embodiments described later.

Operation Example

Next, an example of an operation of the radio communication system according to the first exemplary embodiment will be described with reference to a sequence diagram in FIG. 6.

Figure 6:
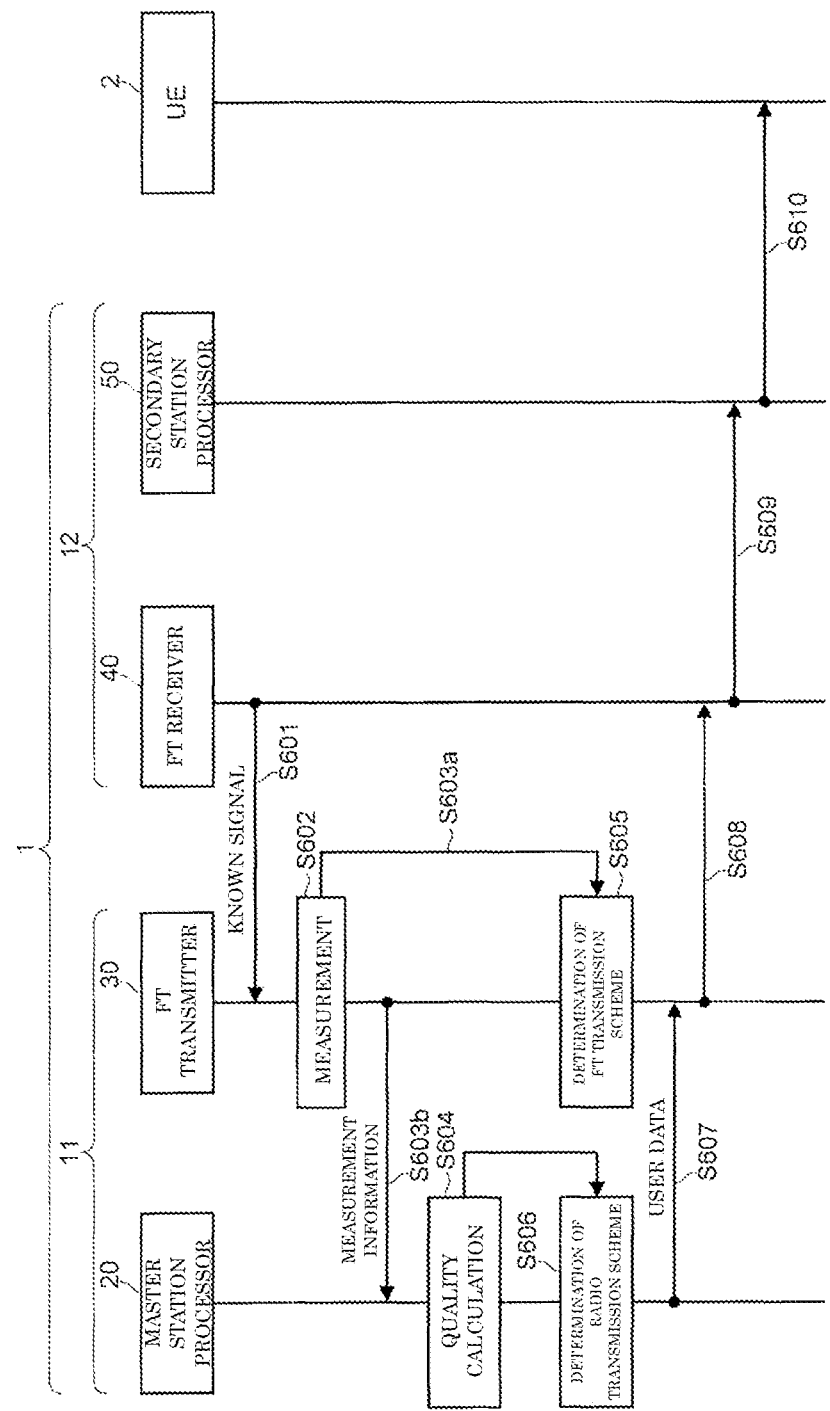
FIG. 6 is a sequence diagram showing an example of an operation of the radio communication system according to the first exemplary embodiment.

As illustrated in FIG. 6, in radio base station 1, a known signal is transmitted from transmitter 407 (see FIG. 4) of FH receiver 40 in secondary station device 12 to FH transmitter 30 (S601). The known signal may be transmitted, for example, upon activation of the radio communication system or at a predetermined timing after the activation. The predetermined timing may be set to a time zone in which the traffic volume of FH 13 is relatively low (for example, early morning or late night) in consideration of reducing the tightness of the FH band, for example.

The known signal is received, for example, by receiver 305 (see FIG. 3) of FH transmitter 30, and is input to measurement unit 306. Measurement unit 306 measures the reception quality of the input known signal (S602).

Information (measurement information) indicating the measurement result is input to, for example, controller 307 (see FIG. 3) of FH transmitter 30 and FH quality calculator 204 (see FIG. 2) of master station processor 20 (S603a and S603b).

In master station processor 20, FH quality calculator 204 determines the FH transmission quality information based on the input measurement information, and outputs the FH transmission quality information to, for example, MAC unit 2024 of master station signal processor 202 #1.

MAC unit 2024 calculates and determines the transmission quality of the propagation path integrating the radio propagation path and the FH propagation path based on, for example, the CQI (not shown) fed back from the UE, the communication quality required for each service type, and the FH transmission quality information (S604).

Then, MAC unit 2024 determines the MCS in the radio transmission section such that, for example, the signal quality when the data propagates through the integrated propagation path satisfies the required quality according to the service type.

As a non-limiting example, MAC unit 2024 combines the SN ratio of the radio transmission section and the SN ratio of the FH transmission section, and determines the appropriate MCS for the integrated propagation path including the radio transmission section and the FH transmission section based on the combined SN ratio (S606).

Meanwhile, in FH transmitter 30, controller 307 to which the measurement information is input determines the transmission scheme of FH transmission, or in other words, the FH transmission parameter used for the FH transmission (for example, at least one of the code type, the coding rate, or the modulation multilevel number) based on the measurement information (S605). Determination processes of S605 and S606 may be executed at the same timing, or may be executed at mutually different (or deviated) timings.

Master station signal processor 202 #1 encodes and modulates the DL signal of service type #1 (for example, user data processed by SDAP unit 2021 and PDCP unit 2022) in accordance with the MCS determined in S606, and outputs the DL signal to FH transmitter 30 (S607). Meanwhile, master station signal processor 202 #2 outputs the DL signal corresponding to service type #2 (for example, the user data processed by SDAP unit 2021 and PDCP unit 2022) to FH transmitter 30 (S607).

In FH transmitter 30, the user data (hereinafter also referred to as "DL data") corresponding to each of service types #1 and #2 is encoded and modulated in corresponding FH transmission processors 302 #1 and 302 #2 in accordance with the FH transmission parameter determined in S605, and transmitted to FH 13 (S608).

The DL data transmitted to FH 13 in master station device 11 is received by receiver 401 of FH receiver 40 in secondary station device 12, and is separately demodulated and decoded into service types #1 and #2 in FH reception processor 403.

The DL data demodulated and decoded in FH receiver 40 is transmitted to secondary station processor 50 (S609). In secondary station processor 50, the DL data received from FH receiver 40 is processed separately by secondary station signal processors 502 #1 and 502 #2 into service types #1 and #2.

For example, secondary station signal processor 502 #1 performs beamforming processing and IFFT (+CP) processing on the received DL data corresponding to service type #1. The DL data that has been processed is transmitted from the antenna to UE 2 as a radio signal (S610).

Meanwhile, secondary station signal processor 502 #2 adds processing of RLC, MAC, coding, scrambling, modulation, layer mapping, precoding, RE mapping, beamforming, and IFFT (+CP) to the DL data corresponding to service type #2. The DL data that has been processed is transmitted from the antenna to UE 2 as a radio signal (S610).

In the first exemplary embodiment, the functional split configuration of master station device 11 and secondary station device 12 differs depending on the service type, and thus the traffic volume of FH 13 can be efficiently reduced. Further, the FH transmission scheme can be properly used in accordance with the difference in the functional split configuration between master station device 11 and secondary station device 12 (in other words, the FH transmission scheme can be optimized for each service type). Therefore, for example, the redundancy of data in the FH transmission can be reduced, and the traffic volume of FH 13 can be reduced.

In addition, when a parameter with low redundancy (deteriorating signal quality) is allowed to be selected as the FH transmission parameter for traffic volume control of the FH transmission, the allowed signal quality deterioration can be compensated by controlling a radio transmission scheme (for example, a parameter of radio transmission such as MCS). Therefore, the transmission quality as a radio communication system can be guaranteed.

Second Exemplary Embodiment

Figure 7:
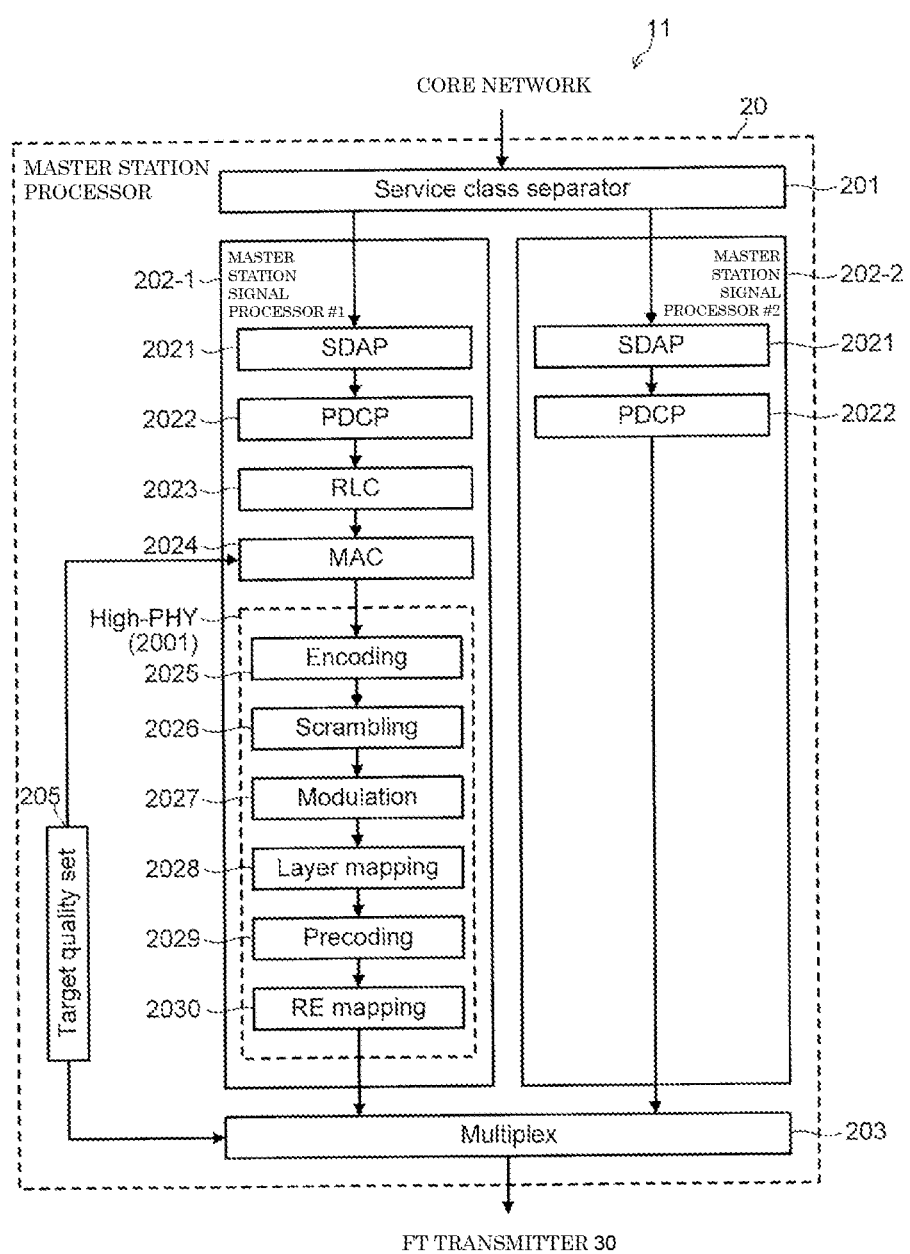
FIG. 7 is a block diagram showing an example of a configuration of a master station processor provided in a master station device according to a second exemplary embodiment.
Figure 8:
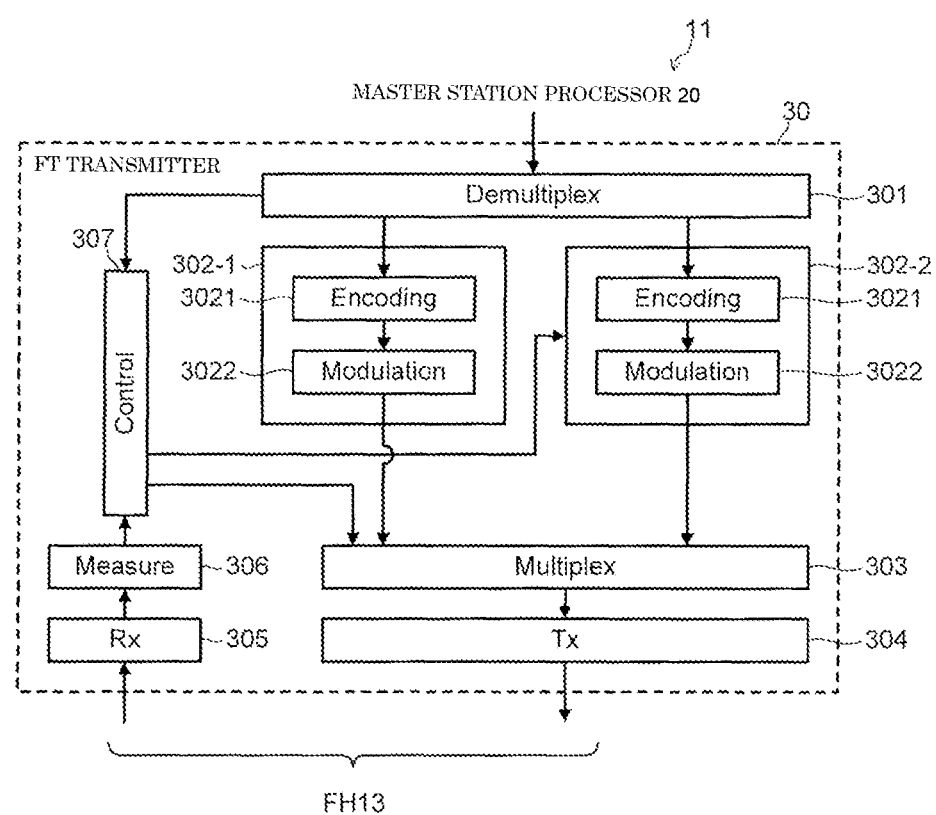
FIG. 8 is a block diagram showing an example of a configuration of an FH transmitter provided in the master station device according to the second exemplary embodiment.

Next, a second exemplary embodiment will be described. FIG. 7 is a block diagram showing an example of a configuration of master station processor 20 provided in master station device 11 according to the second exemplary embodiment. FIG. 8 is a block diagram showing an example of a configuration of FH transmitter 30 provided in master station device 11 according to the second exemplary embodiment.

An example of the configurations of FH receiver 40 and secondary station processor 50 in secondary station device 12 according to the second exemplary embodiment are the same as or similar to the configurations illustrated in FIGS. 4 and 5 in the first exemplary embodiment.

Master station processor 20 illustrated in FIG. 7 is different from master station processor 20 illustrated in FIG. 2 in that master station processor 20 is provided with target quality setting unit 205 instead of FH quality calculator 204.

Further, FH transmitter 30 illustrated in FIG. 8 is different from FH transmitter 30 illustrated in FIG. 3 in that output of target quality setting unit 205 (for example, setting information (or requirement information) on a target quality) is input to controller 307. The setting information (or requirement information) on the target quality may be abbreviated as "target quality information" for convenience.

Hereinafter, the second exemplary embodiment will be described focusing on the above different aspects (or differences).

Target quality setting unit 205 illustrated in FIG. 7 generates, for example, the target quality information for FH 13. The target quality information may be specified in advance as information indicating the quality set or required in FH 13 in accordance with quality requirements for each service type, or may be notified from core network 11.

The target quality information is transmitted to, for example, MAC unit 2024 in at least one master station signal processor 202 #1 illustrated in FIG. 7 and FH transmitter 30 illustrated in FIG. 8. The target quality information transmitted to FH transmitter 30 may be multiplexed with the DL data transmitted to FH transmitter 30 by multiplexer 203, or does not have to be multiplexed with the DL data transmitted to FH transmitter 30. If not multiplexed with the DL data, the target quality information may be transmitted to FH transmitter 30 by bypassing multiplexer 203.

MAC unit 2024 in which the target quality information is input determines the MCS to be applied to the DL data of service type #1 based on, for example, the CQI and the target quality information.

Meanwhile, in FH transmitter 30 illustrated in FIG. 8, the target quality information is received by controller 307. If multiplexed with the DL data, the target quality information is separated by demultiplexer 301 and input to controller 307. On the other hand, if not multiplexed with the DL data, the target quality information is input to controller 307 without going through demultiplexer 301.

Controller 307 illustrated in FIG. 8 determines FH transmission parameter (for example, at least one of the code type, the coding rate, and the modulation multilevel number) #j corresponding to each of master station signal processors 202 #j based on, for example, the target quality information and the measurement information on the transmission quality of FH 13 by measurement unit 306. The FH transmission parameter #j that has been determined is output to corresponding FH transmission processors 302 #1 and 302 #2.

Controller 307 may encode and modulate the control information addressed to secondary station device 12 and output the control information to multiplexer 303, for example. The control information may include, for example, the determined FH transmission parameter. At least one of the target quality information and the quality measurement result by measurement unit 306 may be additionally or alternatively included in the control information.

FH transmission processor 302 (#j) encodes and modulates the DL data in encoder 3021 and modulator 3022 in accordance with FH transmission parameter #j determined based on the target quality information, for example. As a result, the DL data is suitably encoded and modulated for the FH transmission individually for service type #j.

In other words, the FH transmission quality for each service type #j is controlled by FH transmitter 30 based on the target quality information. Therefore, the target quality information may be regarded as an example of the control information that controls the transmission quality of FH 13.

Operation Example

Next, an example of an operation of the radio communication system according to the second exemplary embodiment will be described with reference to a sequence diagram in FIG. 9.

Figure 9:
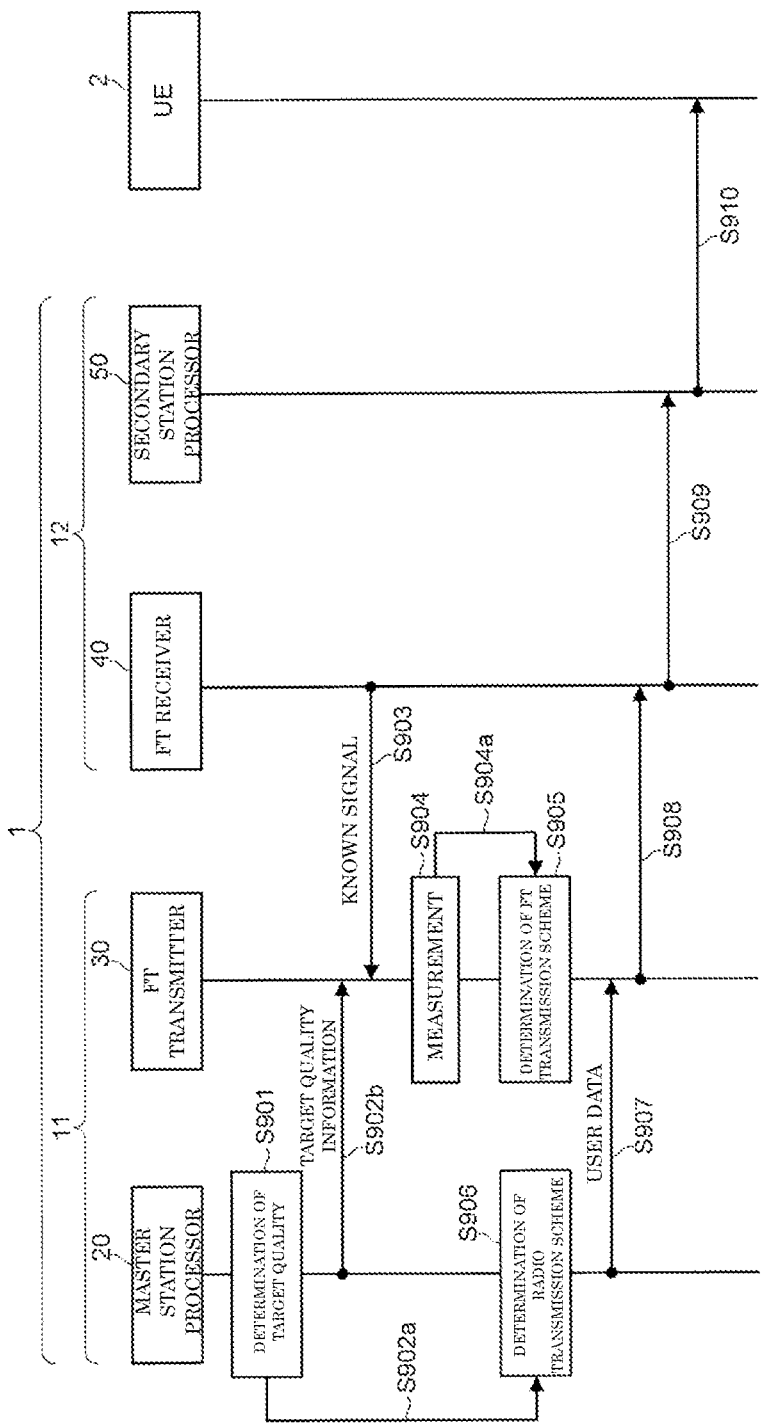
FIG. 9 is a sequence diagram showing an example of an operation of a radio communication system according to the second exemplary embodiment.

As illustrated in FIG. 9, in master station processor 20 of master station device 11, the target quality information is determined by target quality setting unit 205 (S901).

The determined target quality information is transmitted to MAC unit 2024 illustrated in FIG. 7 and controller 307 in FH transmitter 30 illustrated in FIG. 8 (S902a and S902b).

Further, FH transmitter 30 receives a known signal transmitted from FH receiver 40 in secondary station device 12 to FH 13 and propagated through FH 13 (S903). FH transmitter 30 measures the reception quality of the known signal propagating through FH 13 and outputs the measurement result to controller 307 (S904a).

Controller 307 determines FH transmission parameter #j corresponding to each of master station signal processors 202 #j based on the target quality information received in S902b and the measurement result by measurement unit 306 (S905). The FH transmission parameter #j that has been determined is input to corresponding FH transmission processor 302 #j.

Meanwhile, in master station processor 20, the transmission quality of the propagation path integrating the radio propagation path and the FH propagation path is determined in MAC unit 2024 of master station signal processor 202 #1 based on, for example, the CQI fed back from UE 2 and the target quality information input in S902a. Then, MAC unit 2024 determines, for example, the MCS of the radio transmission section to be an MCS whose signal quality when data propagates through the integrated propagation path satisfies the required quality according to the service type (S906).

A reception timing (S903) and a measurement timing (S904) of the known signal in FH transmitter 30 may be after a reception timing (S902b) of the target quality information, or before a reception timing (S902b) of the target quality information.

Determination processes of S905 and S906 may be executed at the same timing, or may be executed at mutually different (or deviated) timings.

Master station signal processor 202 #1 encodes and modulates the DL signal of service type #1 (for example, user data processed by SDAP unit 2021 and PDCP unit 2022) in accordance with the MCS determined in S906, and outputs the DL signal to FH transmitter 30 (S907). Meanwhile, master station signal processor 202 #2 outputs the DL signal corresponding to service type #2 (for example, the user data processed by SDAP unit 2021 and PDCP unit 2022) to FH transmitter 30 (S907).

In FH transmitter 30, the user data (hereinafter also referred to as "DL data") corresponding to each of service types #1 and #2 is encoded and modulated in corresponding FH transmission processors 302 #1 and 302 #2 in accordance with the FH transmission parameter determined in S905, and transmitted to FH 13 (S908).

Subsequent DL data transmission processes S909 and S910 by secondary station device 12 (FH receiver 40 and secondary station processor 50) may be equivalent to processes S609 and S610 described in FIG. 6 of the first exemplary embodiment, respectively.

As described above, the second exemplary embodiment allows an effect equivalent to an effect of the first exemplary embodiment to be obtained, and also can eliminate feedback of the measurement result regarding the FH transmission quality from FH transmitter 30 to master station processor 20 described in the first exemplary embodiment. This can improve utilization efficiency of the FH band.

In the second exemplary embodiment, the feedback of the measurement result regarding the FH transmission quality may be additionally adopted. This feedback, for example, allows master station processor 20 to compensate for deviations and fluctuations in the FH transmission quality from the target quality.

Further, target quality setting unit 205 of master station processor 20 and controller 307 of FH transmitter 30 may be integrally configured as one controller. For example, one of the functions of target quality setting unit 205 and controller 307 may be included in the other function of target quality setting unit 205 or controller 307. Further, measurement unit 306 of FH transmitter 30 may be included in controller 307.

In other words, it is sufficient that the functions of target quality setting unit 205, measurement unit 306, and controller 307 are provided in master station device 11 in the second exemplary embodiment.

Third Exemplary Embodiment

Next, a third exemplary embodiment will be described. In the third exemplary embodiment, for example, a CRC result of the DL data or the acknowledgment (Ack/Nack) information based on the CRC result is used for the measurement of FH transmission quality instead of the known signal such as the training signal.

Figure 10:
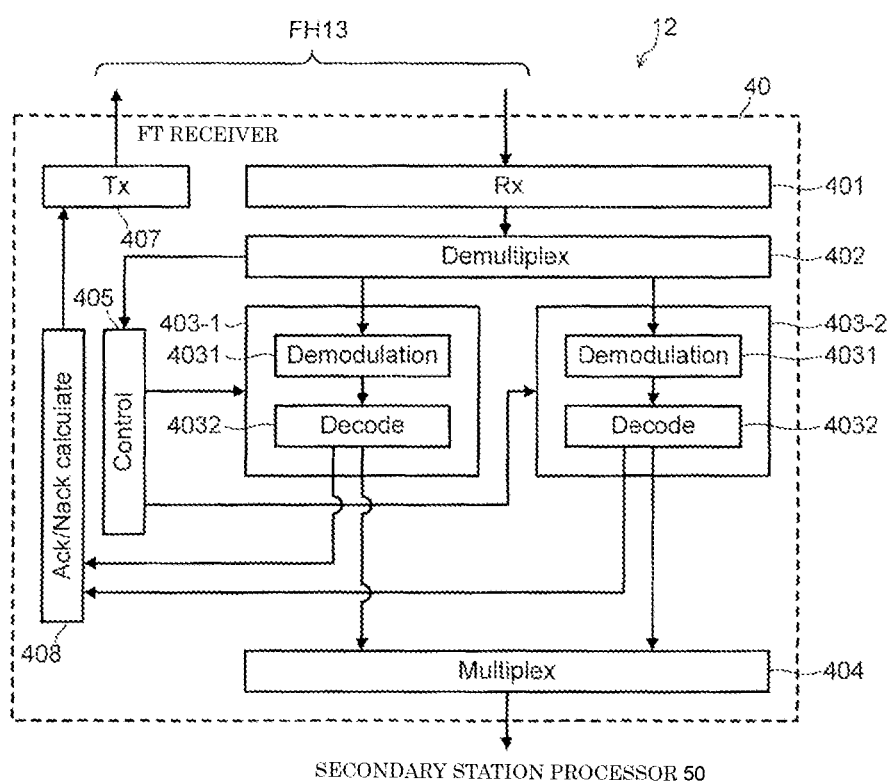
FIG. 10 is a block diagram showing an example of a configuration of an FH receiver provided in a secondary station device according to a third exemplary embodiment.

FIG. 10 is a block diagram showing an example of a configuration of FH receiver 40 provided in secondary station device 12 according to the third exemplary embodiment. FH receiver 40 illustrated in FIG. 10 is different from the configuration illustrated in FIG. 4 in that FH receiver 40 includes Ack/Nack calculator 408 instead of training data unit 406.

In the third exemplary embodiment, a configuration of master station device 11 (master station processor 20 and FH transmitter 30) may be the same as or similar to the configurations illustrated in FIGS. 2 and 3 of the first exemplary embodiment. Further, in the third exemplary embodiment, a configuration of secondary station processor 50 provided in secondary station device 12 may be the same as or similar to the configuration illustrated in FIG. 5 of the first exemplary embodiment.

Hereinafter, the third exemplary embodiment will be described focusing on different aspects (or differences) from the first exemplary embodiment.

Information (Ack/Nack information) indicating an acknowledgment (Ack) or a negative acknowledgement (Nack) from decoders 4032 of secondary station signal processors 502 #1 and 502 #2 is input to Ack/Nack calculator 408 illustrated in FIG. 10. The Ack/Nack information is generated, for example, in each of decoders 4032 of secondary station signal processors 502 #1 and 502 #2 based on a determination of the CRC result.

Ack/Nack calculator 408 calculates, for example, a statistic of the Ack/Nack information (for example, at least one of an Ack rate and a Nack rate) over a specific time period. Ack/Nack statistical information, which is a calculation result, is transmitted (fed back) from transmitter 407 to FH transmitter 30 of master station device 11, for example.

The Ack/Nack statistical information indicates, for example, that the higher the Ack rate (or the lower the Nack rate), the higher the FH transmission quality, and the higher the Nack rate (or the lower the Ack rate), the lower the FH transmission quality. Therefore, the Ack/Nack statistical information may be regarded as an example of FH transmission quality information.

The Ack/Nack statistical information fed back to master station device 11 is received, for example, by receiver 305 of FH transmitter 30 illustrated in FIG. 3. Receiver 305 outputs the received Ack/Nack statistical information to measurement unit 306.

Measurement unit 306 determines or determines the transmission quality of FH 13 based on the Ack/Nack statistical information. The transmission quality of FH 13 may be determined or determined by Ack/Nack calculator 408. In this case, instead of the Ack/Nack statistical information, a result of the determination or determination of the FH transmission quality may be transmitted (fed back) from transmitter 407 to FH transmitter 30 of master station device 11 as an example of the FH transmission quality information.

Operation Example

Next, an example of an operation of the radio communication system according to the third exemplary embodiment will be described with reference to a sequence diagram in FIG. 11.

Figure 11:
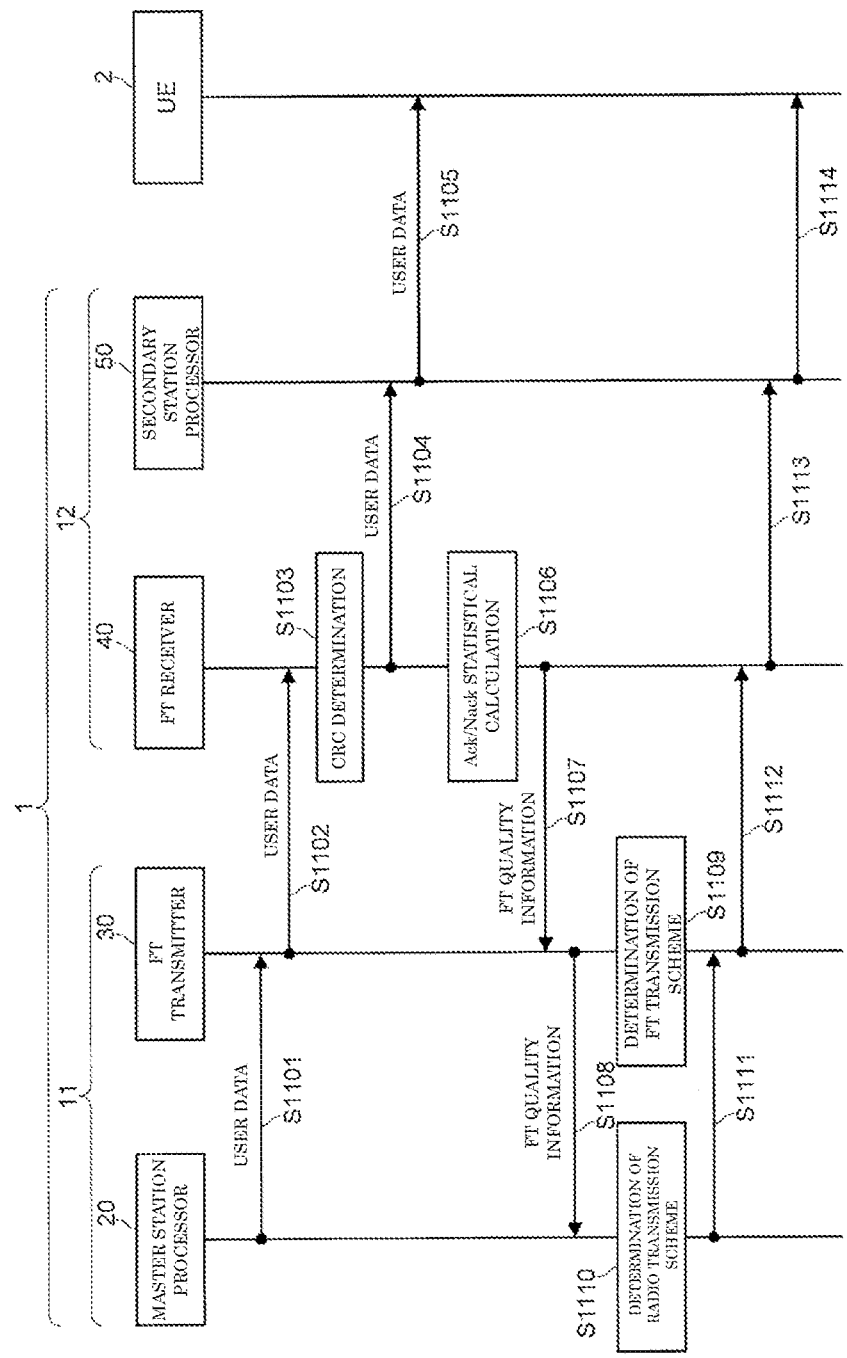
FIG. 11 is a sequence diagram showing an example of an operation of a radio communication system according to the third exemplary embodiment.

As illustrated in FIG. 11, at a certain timing, master station processor 20 of radio base station 1 transmits, for example, user data (DL data) received from the higher-level core network to FH transmitter 30 (S1101). FH transmitter 30 transmits the received DL data to secondary station device 12 via FH 13 (S1102).

In secondary station device 12, the DL data propagated in FH 13 is received by FH receiver 40. In FH receiver 40, the DL data is separated by demultiplexer 402 individually for service type #j and decoded by corresponding decoder 4032.

At that time, decoder 4032 makes a CRC determination of the DL data (S1103), and generates the Ack/Nack information based on a CRC determination result. The decoded DL data is transmitted from FH receiver 40 to secondary station processor 50 (S1104), and secondary station processor 50 transmits the received DL data to UE 2 by a radio signal (51105).

The Ack/Nack information generated by decoder 4032 is input to Ack/Nack calculator 408. Ack/Nack calculator 408 calculates the statistic of the input Ack/Nack information (S1106).

The DL data may be transmitted from FH receiver 40 to secondary station processor 50 after the statistic calculation (S1106) of the Ack/Nack information. Further, the Ack/Nack statistical information may be updated by sequentially repeating the CRC determination (S1103) of the DL data and the Ack/Nack statistical calculation (S1106).

The Ack/Nack statistical information obtained by Ack/Nack calculator 408 is transmitted (fed back) from transmitter 407 of FH receiver 40 to master station device 11 via FH 13 (S1107).

The Ack/Nack statistical information fed back to master station device 11 is received by receiver 305 (see, for example, FIG. 3) of FH transmitter 30. The Ack/Nack statistical information received by receiver 305 is input to measurement unit 306.

Measurement unit 306 determines or determines the FH transmission quality based on the Ack/Nack statistical information, and outputs the result (FH transmission quality information) to controller 307 of FH transmitter 30. Further, the FH transmission quality information is transmitted from measurement unit 306 to master station processor 20 (S1108).

Controller 307 determines the transmission scheme of FH transmission, in other words, the transmission parameter used for the FH transmission (for example, at least one of the code type, the coding rate, and the modulation multilevel number) based on the FH transmission quality information (S1109).

In master station processor 20, the transmission quality of the propagation path integrating the radio propagation path and the FH propagation path is determined in MAC unit 2024 of master station signal processor 202 #1 based on, for example, the CQI fed back from UE 2, the required quality for each service type, and the FH transmission quality information. Then, MAC unit 2024 determines, for example, the MCS of the radio transmission section to be an MCS whose signal quality when data propagates through the integrated propagation path satisfies the required quality according to the service type (S1110).

Determination processes of S1109 and S1110 may be executed at the same timing, or may be executed at mutually different (or deviated) timings.

Master station signal processor 202 #1 encodes and modulates the DL signal of service type #1 (for example, the DL data processed by SDAP unit 2021 and PDCP unit 2022) in accordance with the MCS determined in S1110, and outputs the DL signal to FH transmitter 30 (S1111). Meanwhile, master station signal processor 202 #2 outputs the DL signal corresponding to service type #2 (for example, the DL data processed by SDAP unit 2021 and PDCP unit 2022) to FH transmitter 30 (S1111).

In FH transmitter 30, the DL data corresponding to each of service types #1 and #2 is encoded and modulated in corresponding FH transmission processors 302 #1 and 302 #2 in accordance with the FH transmission parameter determined in S1109, and transmitted to FH 13 (S1112).

Subsequent DL data transmission processes S1113 and S1114 by secondary station device 12 (FH receiver 40 and secondary station processor 50) may be equivalent to processes S609 and S610 described in FIG. 6 of the first exemplary embodiment, respectively.

As described above, the third exemplary embodiment allows an effect equivalent to the effect of the first exemplary embodiment to be obtained, and also can eliminate the transmission and reception of the known signal for the FH transmission quality measurement in the first exemplary embodiment. This can improve utilization efficiency of the FH band.

In the third exemplary embodiment, the FH transmission quality measurement using the known signal in the first exemplary embodiment may be additionally adopted. For example, the FH transmission quality may be measured using the known signal in advance, and fluctuations that may occur in the measurement result may be corrected by using the Ack/Nack statistical information. Further, the Ack/Nack statistical information may be notified to master station device 20, and master station device 20 may correct and update the radio transmission scheme based on the Ack/Nack statistical information.

Here, measuring the FH transmission quality in advance may mean that the FH transmission quality is measured at a timing prior to the CRC determination (see S1103 in FIG. 11), for example, during system startup.

Functions of Ack/Nack calculator 408 of FH receiver 40 may be included in controller 405. Further, Ack/Nack calculator 408 may be provided outside FH receiver 40, and has only to be provided in secondary station device 12.

Fourth Exemplary Embodiment

Next, a fourth exemplary embodiment will be described. In the fourth exemplary embodiment, an example of a configuration focusing on the UL of radio base station 1 in the first exemplary embodiment will be described with reference to FIGS. 12 to 16.

Figure 12:
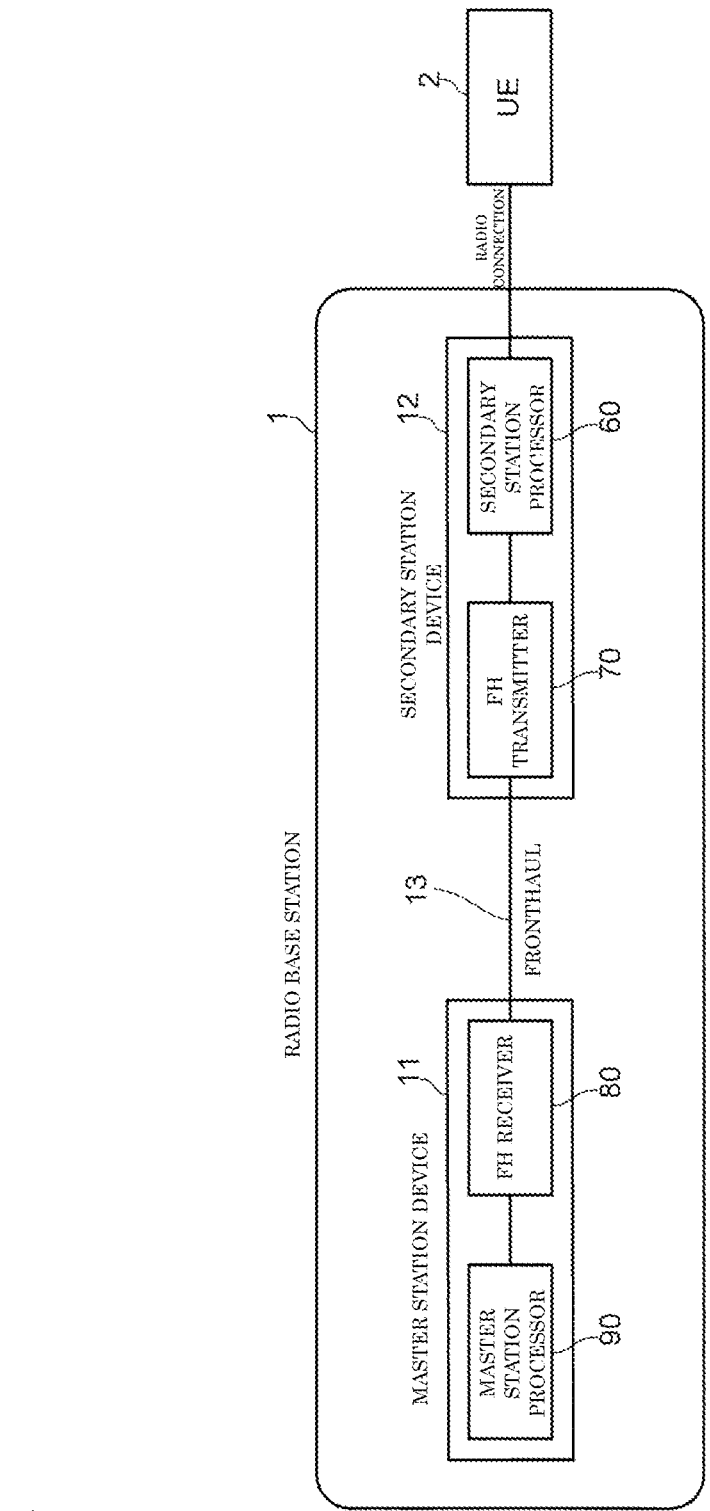
FIG. 12 is a diagram showing an example of a configuration of a radio communication system according to a fourth exemplary embodiment.

FIG. 12 is a diagram showing an example of a configuration of a radio communication system according to the fourth exemplary embodiment. Radio base station 1 illustrated in FIG. 12 includes secondary station processor 60 and FH transmitter 70 in secondary station device 12, and radio base station 1 includes FH receiver 80 and master station processor 90 in master station device 11.

As in the first to third exemplary embodiments, the number of radio base stations 1 and the number of UE 2 may be more than or equal to two. Further, in master station device 11, master station processor 20 of the DL and master station processor 90 of the UL may be configured as physically different devices, or may be realized in the physically same device.

Similarly, FH transmitter 30 of the DL and FH receiver 80 of the UL may be configured as physically different devices or may be realized in the physically same device. Further, FH transmitter 30 and FH receiver 80 may be integrated as, for example, an FH transmission and reception device or an FH communication device shared by the DL and the UL.

Similarly, in secondary station device 12, FH receiver 40 of the DL and FH transmitter 70 of the UL may be configured as physically different devices, or may be realized in the physically same device. Further, FH receiver 40 and FH transmitter 70 may be integrated as, for example, an FH transmission and reception device or an FH communication device shared by the DL and the UL.

Further, secondary station processor 50 of the DL and secondary station processor 60 of the UL may be configured as physically different devices, or may be realized in the physically same device.

Further, in master station device 11, at least one of master station processor 20 of the DL and master station processor 90 of the UL may include logical slices.

Similarly, in secondary station device 12, at least one of secondary station processor 50 of the DL and secondary station processor 60 of the UL may include logical slices.

At least one of master station device 11 and secondary station device 12 may include logical slices.

<Secondary Station Device 12>

Figure 13:
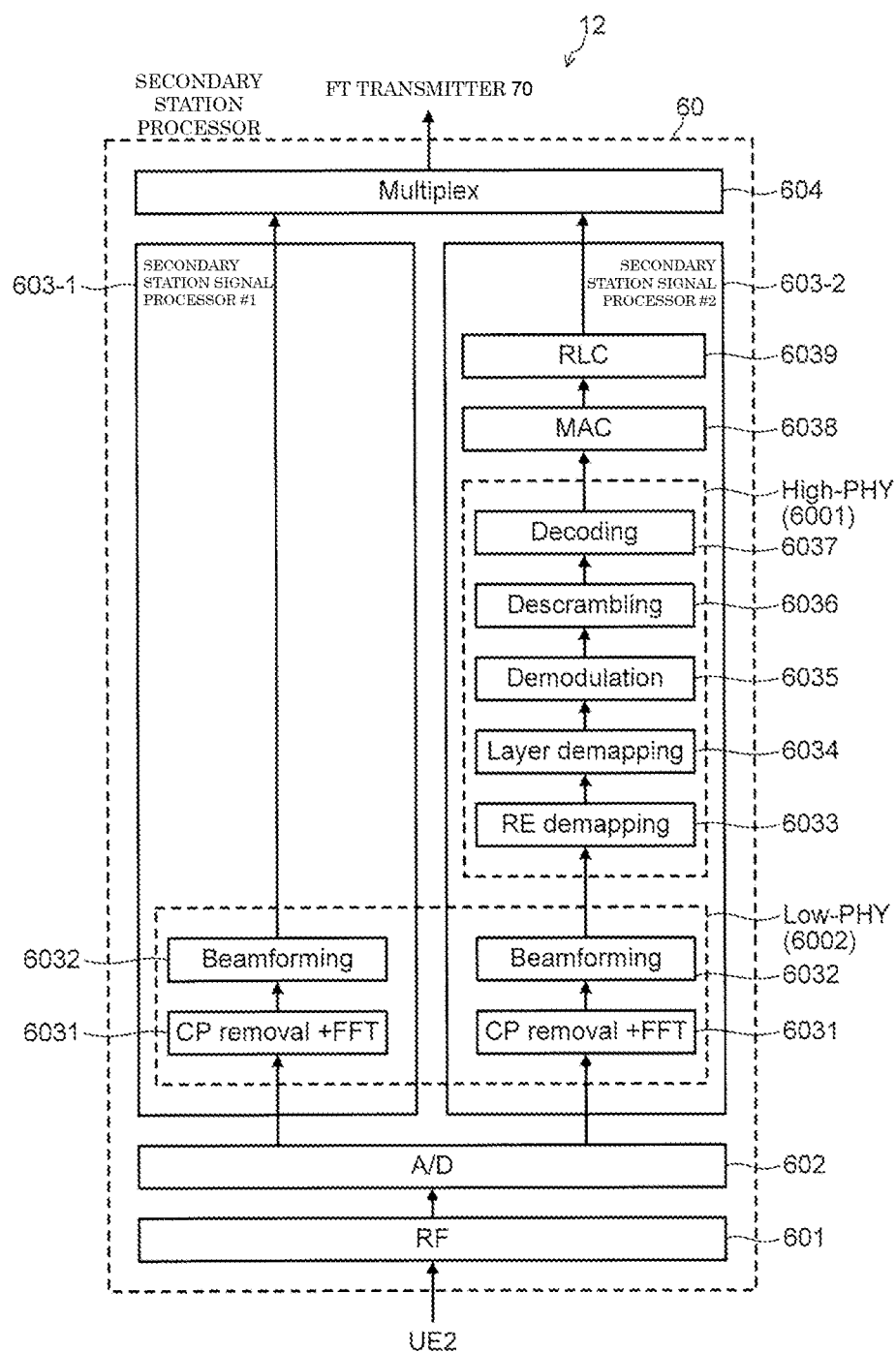
FIG. 13 is a block diagram showing an example of a configuration of a secondary station processor provided in a secondary station device according to the fourth exemplary embodiment.
Figure 14:
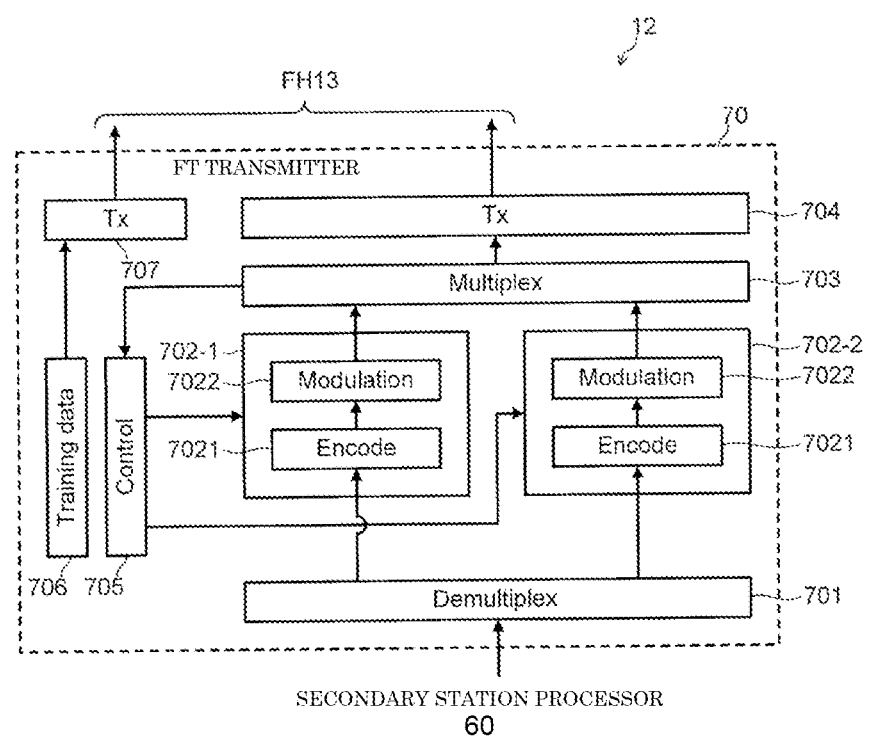
FIG. 14 is a block diagram showing an example of a configuration of an FH transmitter provided in the secondary station device according to the fourth exemplary embodiment.

FIG. 13 is a block diagram showing an example of a configuration of secondary station processor 60 provided in secondary station device 12, and FIG. 14 is a block diagram sowing an example of a configuration of FH transmitter 70 provided in secondary station device 12.

(Secondary Station Processor 60)

As illustrated in FIG. 13, secondary station processor 60 includes, for example, RF unit 601, analog to digital (A/D) converter 602, secondary station signal processors 603-1 and 603-2, and multiplexer 604.

Secondary station signal processors 603-1 and 603-2 may be referred to as secondary station signal processors 603 #1 and 603 #2, respectively. Further, secondary station signal processors 603-1 and 603-2, which are not distinguished from each other, may be referred to as secondary station signal processor 603. The number of secondary station signal processors 603 provided in secondary station processor 60 is not limited to two, and may be three or more. For example, N secondary station signal processors 603 corresponding to the number N of service types may be referred to as secondary station signal processor 603 #j (j=1 to N).

Secondary station signal processor 603 #1 and secondary station signal processor 603 #2 may be realized by physically different devices, or may be realized by being split into logical slices, for example.

RF unit 601 has an antenna, for example, receives a radio signal of the UL transmitted from UE 2 by the antenna, and performs reception RF processing such as down-conversion processing and low noise amplification processing on the received radio signal.

A/D converter 602 converts, for example, an output (analog signal) of RF unit 601 into a digital signal.

Secondary station signal processors 603-1 and 603-2 have different functional split configurations. For example, secondary station signal processor 603-1 includes CP removal+FFT unit 6031 and beamforming unit 6032 depending on the functional split point in master station signal processor 902-1 (see FIG. 16) corresponding to service type #1.

Meanwhile, secondary station signal processor 603-2 includes, for example, CP removal+FFT unit 6031, beamforming unit 6032, resource element (RE) demapping unit 6033, layer demapping unit 6034, demodulator 6035, descrambling unit 6036, decoder 6037, MAC unit 6038, and RLC unit 6039, depending on the functional split point in master station signal processor 902-2 corresponding to service type #2.

In secondary station signal processor 603-1, CP removal+FFT unit 6031 and beamforming unit 6032 form, for example, lower physical layer (Low-PHY) block 6002.

CP removal+FFT unit 6031 of secondary station signal processor 603-1 performs FFT and CP removal on the output of A/D converter 602, for example.

Beamforming unit 6032 of secondary station signal processor 603-1 performs, for example, a reception beam forming process on an output of CP removal+FFT unit 6031.

Meanwhile, in secondary station signal processor 603-2, functional units 6031 to 6039 form, for example, High-PHY block 6001. Further, in secondary station signal processor 603-2, FFT+CP unit 6031 and beamforming unit 6032 form, for example, Low-PHY block 6002.

Low-PHY block 6002 may be individually provided for or shared by secondary station signal processors 603-1 and 603-2. When Low-PHY block 6002 is shared by secondary station signal processors 603-1 and 603-2, the processing of the plurality of different secondary station signal processors 603 may be executed in parallel in one Low-PHY block 6002. Further, control information related to UE transmission for demodulating and decoding the user data signal at the radio base station is transmitted from radio base station 1 to UE 2 (not shown). For example, radio base station 1 notifies UE 2 of the control information by the PDCCH. UE 2 transmits a user data signal to radio base station 1 via a physical uplink shared channel (PUSCH) based on the control information received by the PDCCH.

In secondary station signal processor 603-2, CP removal+FFT unit 6031 performs FFT and CP removal on the output of A/D converter 602, for example, and beamforming unit 6032 performs reception beam forming processing on an output of CP removal+FFT unit 6031, for example.

Further, in secondary station signal processor 603-2, RE demapping unit 6033 demaps a UL signal mapped to the radio resource (for example, RE).

Layer demapping unit 6034 demaps the UL signal mapped for each layer at an output of RE demapping unit 6033, for example. Layer demapping unit 6034, which is used for the MIMO transmission, may be omitted when the MIMO transmission is not applied.

Demodulator 6035 demodulates, for example, an output of layer demapping unit 6034 by a demodulation scheme corresponding to a modulation scheme such as QPSK, 16QAM, 64QAM, or 256QAM.

Descrambling unit 6036 performs descrambling processing for descrambling an output of demodulator 6035, for example.

Decoder 6037 decodes, for example, an output of descrambling unit 6036.

For example, MAC unit 6038 generates the RLC PDU from the MAC PDU of the UL signal and outputs the RLC PDU to RLC unit 6039.

Multiplexer 604 multiplexes outputs of the plurality of different secondary station signal processors 603-1 and 603-2, and transmits the multiplexed signal to FH transmitter 70 (see FIG. 14). TDM, FDM, CDM, or WDM may be applied to the multiplexing scheme in multiplexer 604 as a non-limiting example.

In multiplexer 604, information for identifying the output signal of secondary station signal processor 603 #j (for example, signal ID #j) may be assigned. For example, a signal ID may be assigned to each of the output signals of secondary station signal processor 603 #j. Further, for example, the time slot information for TDM, the frequency information for FDM, the coding information for CDM, and the wavelength information for WDM may each serve as the signal ID.

Further, multiplexer 604 may be omitted. For example, the outputs of the plurality of different secondary station signal processors 603 #1 and 603 #2 may be physically separated and input to FH transmitter 70.

Further, secondary station signal processor 603 #1 and secondary station signal processor 603 #2 may be realized by physically different devices, or may be logically realized by being split in the same device using, for example, virtualization technology.

Further, the number of secondary station signal processors 603 #j may be two or more, and may be changed dynamically or adaptively for the logical split. For example, as described above, when the service type supported by radio base station 1 changes, as the number of slices #j corresponding to secondary station signal processor 603 #j increases and decreases, the number of slices #j corresponding to secondary station signal processor 603 #j may also increase and decrease.

Further, one or both of RF unit 601 and A/D converter 602 illustrated in FIG. 13 may be individually provided for the plurality of different secondary station signal processors 603 #j.

(FH Transmitter 70)

Next, an example of a configuration of FH transmitter 70 according to the fourth exemplary embodiment will be described with reference to FIG. 14.

As illustrated in FIG. 14, FH transmitter 70 includes, for example, demultiplexer 701, FH transmission processors 702-1 and 702-2, multiplexer 703, transmitter 704, controller 705, training data unit 706, and transmitter 707.

FH transmission processors 702-1 and 702-2 may be referred to FH transmission processors 702 #1 and 702 #2, respectively. Further, FH transmission processors 702-1 and 702-2, which are not distinguished from each other, may be referred to as FH transmission processor 702. The number of FH transmission processors 702 provided in FH transmitter 70 is not limited to two, and may be three or more. For example, N FH transmission processors 702 corresponding to the number N of service types may be referred to as FH transmission processor 702 #j (j=1 to N).

FH transmission processor 702 #1 and FH transmission processor 702 #2 may be realized by physically different devices, or may be realized by being split by software or hardware circuits in the same device, for example.

For example, demultiplexer 701 separates the multiplex signal of the UL received from secondary station processor 60 for service type #j based on the signal ID described above, and separately outputs the multiplex signals to corresponding FH transmission processor 702 #j. Further, demultiplexer 701, for example, separates the control information multiplexed on the UL signal received from FH 13, and outputs the control information to controller 705. The control information may include, for example, information on the MCS used in MAC unit 6038.

When multiplexer 604 is omitted in secondary station processor 60, demultiplexer 701 may also be omitted. For example, the outputs of the plurality of different secondary station signal processors 603 #1 and 603 #2 may be physically separated and input to FH transmission processors 702 #1 and 702 #2, respectively.

Controller 705 decodes the control information input from demultiplexer 701 and outputs the control information to FH transmission processor 702 #j.

Each of FH transmission processors 702 #j includes, for example, encoder 7021 and modulator 7022.

Encoder 7021 decodes the output of demodulator 4031 in accordance with, for example, the control information from controller 705.

Modulator 7022 modulates an output of encoder 7021 in accordance with, for example, the control information from controller 705.

For example, multiplexer 703 multiplexes outputs of the plurality of different FH transmission processors 702 #j and outputs the multiplexed output to transmitter 704. The signal multiplexed in multiplexer 703 corresponds to a signal addressed to the plurality of different master station signal processors (for example, master station signal processors 902 #1 and 902 #2 described later in FIG. 16) in master station processor 90.

Note that TDM, FDM, CDM, or WDM may be applied to the multiplexing scheme in multiplexer 703 as a non-limiting example. In multiplexer 703, information for identifying the output signal of FH transmission processor 702 #j (for example, signal ID #j) may be assigned. For example, a signal ID may be assigned to each of the output signals of FH transmission processors 702 #j. Further, for example, the time slot information for TDM, the frequency information for FDM, the coding information for CDM, and the wavelength information for WDM may each serve as the signal ID.

Transmitter 704 performs transmission processing according to a wired transmitting means (or a wired interface) such as a UTP cable, an STP cable, or an optical fiber cable on the output of multiplexer 703, and transmits the output to FH 13.

Similar to training data unit 406 described above, training data unit 706 generates, for example, a known signal (for example, a training signal) for measuring the transmission quality of FH 13 and outputs the known signal to transmitter 707.

Transmitter 707 transmits, for example, the known signal to FH 13 connected master station device 11 (for example, FH receiver 80). The known signal transmitted to FH 13 is received, for example, by receiver 801 (see FIG. 15) of FH receiver 80 in master station device 11.

Alternatively, in transmission quality measurement of FH 13 using the known signal, FH receiver 80 transmits the known signal to FH transmitter 70, FH transmitter 70 measures the transmission quality of FH 13, and the measurement result may be fed back to FH receiver 80.

Further, controller 705, training data unit 706, and transmitter 707 may be common to controller 405, training data unit 406, and transmitter 407 illustrated in FIG. 4, respectively. In other words, a transmission system of the known signal and a control system of the FH transmission quality may be shared by the DL and the UL.

Further, functions of one or both of training data unit 706 and transmitter 707 may be included in controller 705. A part or all of controller 705, training data unit 706, and transmitter 707 may be provided outside FH transmitter 70, and have only to be provided in secondary station device 12.

<Master Station Device 11>

Next, an example of a configuration focusing on the UL of master station device 11 will be described with reference to FIGS. 15 and 16.

(FH Receiver 80)

Figure 15:
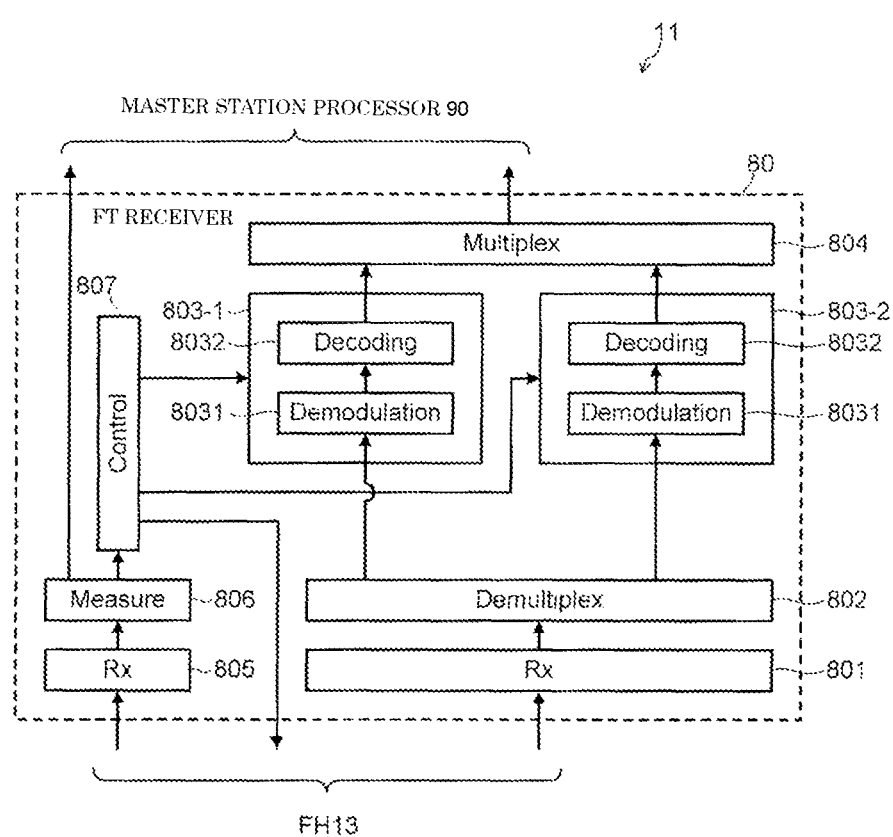
FIG. 15 is a block diagram showing an example of a configuration of an FH receiver provided in a master station device according to the fourth exemplary embodiment.

FIG. 15 is a block diagram showing an example of the configuration of FH receiver 80 provided in master station device 11. As illustrated in FIG. 15, FH receiver 80 includes, for example, receiver 801, demultiplexer 802, FH reception processors 803-1 and 803-2, multiplexer 804, receiver 805, measurement unit 806, and controller 807.

FH reception processors 803-1 and 803-2 may be referred to as FH reception processors 803 #1 and 803 #2, respectively. FH reception processors 803-1 and 803-2, which are not distinguished from each other, may be referred to as FH reception processor 803. The number of FH reception processors 803 provided in FH receiver 80 is not limited to two, and may be three or more. For example, N FH reception processors 803 corresponding to the number N of service types may be referred to as FH reception processor 803 #j (j=1 to N).

FH reception processor 803 #1 and FH reception processor 803 #2 may be realized by physically different devices, or may be realized by being split by software or hardware circuits in the same device, for example.

For example, receiver 801 receives the UL signal received from secondary station device 12 via FH 13, performs reception processing according to a wired transmitting means (or a wired interface) such as a UTP cable, an STP cable, and an optical fiber cable, and outputs the signal to demultiplexer 802.

Demultiplexer 802 separates signals corresponding to a plurality of different secondary station signal processors 603 #j from the output of receiver 801, for example, based on the above signal ID, and outputs the signal to FH reception processor 803 #j.

Receiver 805 receives, for example, a known signal (for example, a training signal) transmitted from FH transmitter 70 of secondary station device 12 and propagated through FH 13, and outputs the known signal to measurement unit 806.

Measurement unit 806 measures the reception quality of the known signal input from receiver 805, and outputs the quality measurement result to, for example, controller 807.

Based on the quality measurement result by measurement unit 806, controller 807 determines an FH transmission parameter (for example, at least one of the code type, the coding rate, and the modulation multilevel number) #j corresponding to each of secondary station signal processors 603 #j, and output the FH transmission parameter to FH reception processors 803 #1 and 803 #2.

Controller 807 may encode and modulate the control information addressed to secondary station device 12 and transmit the control information to controller 705 of FH transmitter 70, for example. The control information may include, for example, the determined FH transmission parameter. The quality measurement result by measurement unit 806 may be additionally or alternatively included in the control information.

Each of FH reception processors 803 #j includes demodulator 8031 and decoder 8032.

Demodulator 8031 demodulates the output of demultiplexer 802 in accordance with, for example, the control information (for example, FH transmission parameter #j) from controller 807.

Decoder 8032 decodes an output of demodulator 8031 in accordance with, for example, the control information (for example, FH transmission parameter #j) from controller 807.

Multiplexer 804 multiplexes outputs of the plurality of different FH reception processors 803 #j and outputs the multiplexed output to master station processor 90, for example. The signal multiplexed in multiplexer 804 corresponds to a signal addressed to the plurality of different secondary station signal processors (for example, master station signal processors 902 #1 and 902 #2 in FIG. 16) in master station processor 90.

Note that TDM, FDM, CDM, or WDM may be applied to the multiplexing scheme in multiplexer 804 as a non-limiting example. In multiplexer 804, information for identifying the output signal of FH reception processor 803 #j (for example, signal ID #j) may be assigned. For example, a signal ID may be assigned to each of the output signals of FH transmitter #j. Further, for example, time slot information for TDM, frequency information for FDM, and wavelength information for WDM may each serve as the signal ID.

Multiplexer 804 may be omitted. For example, the outputs of the plurality of different FH reception processors 803 #1 and 803 #2 may be physically separated and input to master station processor 90.

Further, receiver 805, measurement unit 806, and controller 807 may be common to receiver 305, measurement unit 306, and controller 307 illustrated in FIG. 3, respectively. In other words, the measurement system using the known signal and the control system of the FH transmission quality may be shared by the DL and the UL.

(Master Station Processor 90)

Next, an example of a configuration of master station processor 90 will be described with reference to FIG. 16. As illustrated in FIG. 16, master station processor 90 includes, for example, demultiplexer 901, master station signal processors 902-1 and 902-2, service class multiplexer 903, and FH quality calculator 904.

Master station signal processors 902-1 and 902-2 may be referred to as master station signal processors 902 #1 and 902 #2, respectively. Further, master station signal processors 902-1 and 902-2, which are not distinguished from each other, may be referred to as master station signal processor 902. The number of master station signal processors 902 provided in master station processor 90 is not limited to two, and may be three or more. For example, assuming that the number of service types is N (where N is an integer of two or more), N master station signal processors 902 may be described as master station signal processor 902 #j (j=1 to N).

Figure 16:
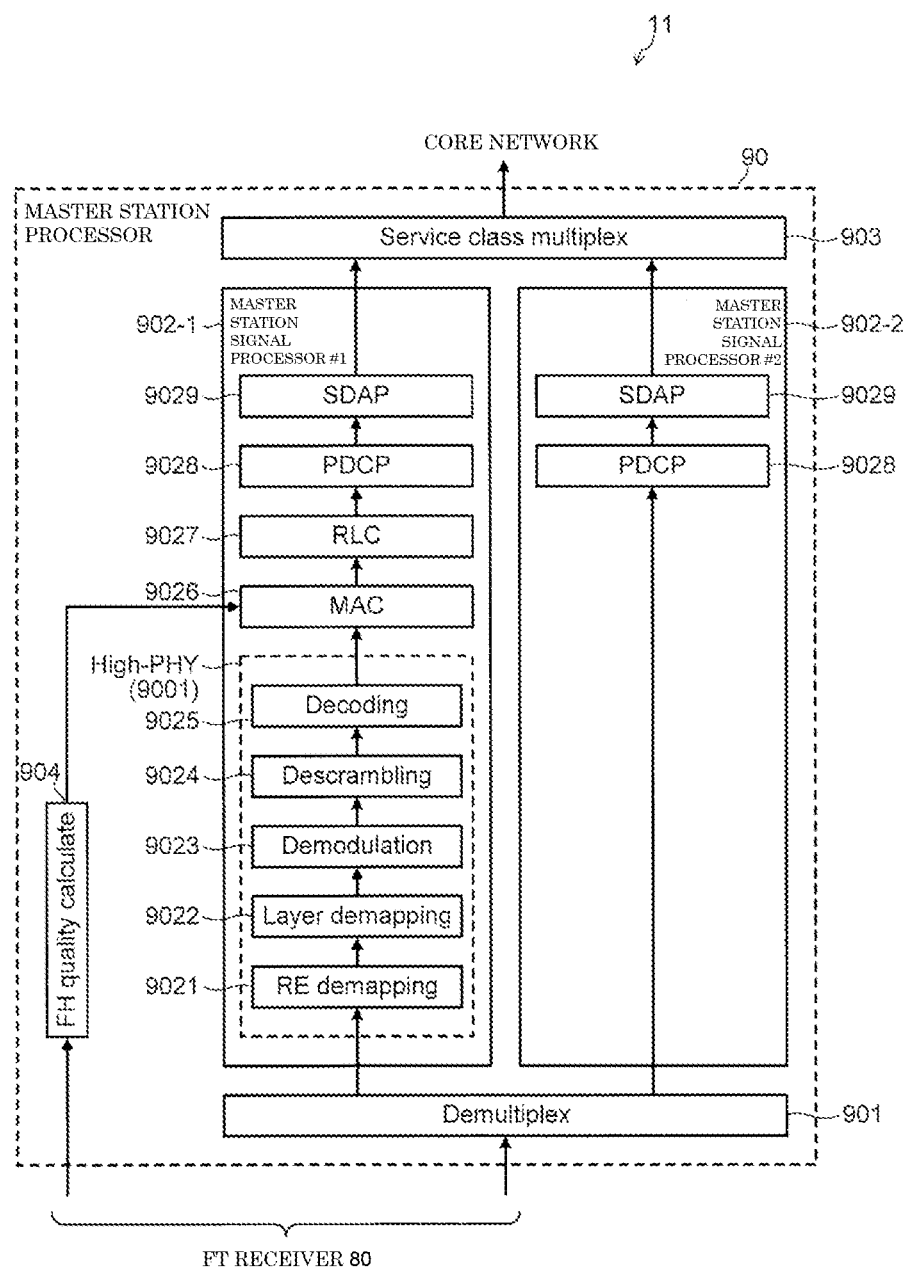
FIG. 16 is a block diagram showing an example of a configuration of a master station processor provided in the master station device according to the fourth exemplary embodiment.

As illustrated in FIG. 16, master station signal processor 902 #1 includes, for example, resource element (RE) demapping unit 9021, layer demapping unit 9022, demodulator 9023, descrambling unit 9024, and decoder 9025. These functional units 9021 to 9024 form High-PHY block 9001.

Further, master station signal processor 902 #1 includes, for example, MAC unit 9026, RLC unit 9027, PDCP unit 9028, and SDAP unit 9029.

These functional units 9021 to 9029, together with functional units 6031 and 6032 in secondary station signal processor 603 #1, are a non-limiting example of the plurality of base station functional units (related to the UL) provided in radio base station 1.

RE demapping unit 9021, for example, demaps the UL signal corresponding to service type #1 separated in demultiplexer 901 from a predetermined radio resource (for example, RE).

Layer demapping unit 9022 demaps the UL signal mapped for each layer at an output of RE demapping unit 9021, for example. Layer demapping unit 9022, which is used for the MIMO transmission, may be omitted when the MIMO transmission is not applied.

Demodulator 9023 demodulates an output of layer demapping unit 9022 by a demodulation scheme corresponding to a modulation scheme such as QPSK, 16QAM, 64QAM, or 256QAM.

Descrambling unit 9024 performs descrambling processing for descrambling an output of demodulator 9023, for example.

Decoder 9025 decodes, for example, an output of descrambling unit 9024.

MAC unit 9026 generates an RLC PDU from a MAC PDU and outputs a transport block. Further, MAC unit 9026, for example, controls retransmission by the HARQ, determines UE 2 to which communication opportunity of the UL is allocated by scheduling, determines MCS in the radio transmission of the UL, and transmits control information to UE 2 by the physical downlink control channel (PDCCH).

Here, the MCS may be determined based on, for example, the CQI fed back from UE 2, the communication quality required for each service type, and the FH transmission quality information input from FH quality calculator 904.

RLC unit 9027 performs processing such as the error detection and the retransmission control by ARQ on the output of MAC unit 9026, and outputs a PDCP PDU.

PDCP unit 9028 performs processing such as decoding of encoded user data and header depression on the output of RLC unit 9027, and outputs the SDAP PDU to SDAP unit 9029.

For example, SDAP unit 9029 maps the QoS flow and the radio bearer, removes the SDAP header from the output of PDCP unit 9028, and transmits the output to the higher-level core network.

FH quality calculator (or FH quality determiner) 904 determines the FH transmission quality information based on the information on the FH transmission quality measured by measurement unit 806 of FH receiver 80 and fed back to master station processor 90.

The FH transmission quality information is input to, for example, MAC unit 9026 in at least one master station signal processor 902 #1. In addition, the FH transmission quality information may be input to MAC unit 9026 in another master station signal processor 902 #j (for example, j=2) different from master station signal processor 902 #1.

For example, MAC unit 9026 calculates transmission quality of a propagation path of the UL integrating an FH propagation path and a radio propagation path, based on radio quality information indicated by the CQI fed back from UE 2 and the FH transmission quality information. Then, MAC unit 9026 determines the MCS such that, for example, the transmission quality when the data propagates through the integrated propagation path satisfies a required quality according to the service type.

As a non-limiting example, MAC unit 9026 combines the SN ratio of a radio transmission section of the UL and the SN ratio of the FH transmission section. MAC unit 9026 determines the MCS suitable for the integrated propagation path of the UL including the radio transmission section and the FH transmission section based on the combined SN ratio.

In the fourth exemplary embodiment, when deterioration in the FH transmission quality is allowed, an MCS capable of compensating for the allowed signal quality deterioration in the FH transmission may be selected for determination of the MCS (in other words, control of the radio transmission scheme).

Then, MAC unit 9026 outputs control information such as information on the determined MCS information and information on the resources (for example, resource element (RE)) or the layers used for the radio transmission of the UL to High-PHY block 9001.

Meanwhile, as illustrated in FIG. 16, master station signal processor 902 #2 includes, for example, PDCP unit 9028 and SDAP unit 9029. Functions of PDCP unit 9028 and SDAP unit 9029 may be the same as or similar to those in master station signal processor 902 #1.

In other words, RE demapping unit 9021, layer demapping unit 9022, demodulator 9023, descrambling unit 9024, decoder 9025, MAC unit 9026, and RLC unit 9027 are not disposed in master station signal processor 902 #2. As illustrated in FIG. 13, the functional units corresponding to functional units 9021 to 9027 are disposed in secondary station processor 60 (secondary station signal processor 603 #2).

Thus, master station signal processor 902 #2 of the UL has a different functional split configuration from master station signal processor 902 #1. In other words, master station signal processor 902 #1 and master station signal processor 902 #2 of the UL have different functional split points regarding the base station function.

Next, in FIG. 16, service class multiplexer 903 multiplexes the UL signal for each service type, which is the output of master station signal processors 902 #1 or 902 #2, for example, and transmits the UL signal to the higher-level core network (for example, EPC and 5GC). A disposition position of service class multiplexer 903 is not limited to a position shown in FIG. 16. For example, service class multiplexer 903 may be disposed before PDCP unit 9028 or before SDAP unit 9029, which will be described later.

Demultiplexer 901 may be omitted when multiplexer 804 is omitted in FH receiver 80 illustrated in FIG. 15. For example, the outputs of the plurality of different FH reception processors 803-1 and 803-2 may be physically separated and input to master station signal processors 902-1 and 902-2, respectively.

Further, master station signal processor 902-1 and master station signal processor 902-2 may be realized by physically different devices, or may be logically realized by slices split in the same device using, for example, virtualization technology.

Further, the number of master station signal processors 902 of the UL may be two or more as described above, and may be changed dynamically or adaptively for the logical split. For example, when the service type supported by radio base station 1 changes, a configuration suitable for the service type can be realized by increasing or decreasing the number of slices in accordance with the change of the service type.

For example, in radio base station 1, slices suitable for the service types supported in the UL, such as slices for the eMBB, slices for the URLLC, and slices for the mMTC, can be added or deleted as needed. This makes it possible to flexibly realize a base station configuration of the UL suitable for the service type.

Further, at least one of master station processor 90 and secondary station processor 60 of the UL may include logical slices.

Operation Example

In an operation example focusing on the UL according to the fourth exemplary embodiment, for example, the "user data" flows in an opposite direction in the sequence diagram illustrated in FIG. 6 of the first exemplary embodiment. The operation example corresponds to an operation in which master station processor 20, FH transmitter 30, FH receiver 40, and secondary station processor 50 are replaced with master station processor 90, FH receiver 80, FH transmitter 70, and secondary station processor 60, respectively.

As described above, the fourth exemplary embodiment allows an effect in the UL equivalent to the effect of the first exemplary embodiment to be obtained.

Measurement unit 806 of FH receiver 80 may include a function of FH quality calculator 904 (see FIG. 16) of master station processor 90. In that case, master station processor 90 does not have to be provided with FH quality calculator 904.

Further, FH quality calculator 904 of master station processor 90 and controller 807 of FH receiver 80 may be integrally configured as one controller. For example, one of the functions of FH quality calculator 904 and controller 807 may be included in the other function of FH quality calculator 904 or controller 807. Further, measurement unit 806 of FH receiver 80 may be included in controller 807.

In other words, it is sufficient that the functions of FH quality calculator 904, measurement unit 806, and controller 807 are provided in master station device 11.

Fifth Exemplary Embodiment

A UL configuration corresponding to the second exemplary embodiment corresponds to a configuration in which FH quality calculator 904 is replaced with a functional unit equivalent to target quality setting unit 205 illustrated in FIG. 7 of the second exemplary embodiment in master station processor 90 illustrated in FIG. 16. Further, in FH receiver 80 illustrated in FIG. 15, measurement unit 806 does not have to feed back the FH transmission quality information which is the measurement result of the known signal to FH quality calculator 904.

In the fifth exemplary embodiment, the UL configurations of secondary station processor 60 and FH transmitter 70 in secondary station device 12 may be the same as or similar to the configurations illustrated in FIGS. 13 and 14.

In an operation example focusing on the UL according to the fifth exemplary embodiment, for example, the "user data" flows in an opposite direction in the sequence diagram illustrated in FIG. 9 of the second exemplary embodiment. The operation example corresponds to an operation in which master station processor 20, FH transmitter 30, FH receiver 40, and secondary station processor 50 are replaced with master station processor 90, FH receiver 80, FH transmitter 70, and secondary station processor 60, respectively.

As described above, the fifth exemplary embodiment allows an effect in the UL equivalent to the effect of the second exemplary embodiment to be obtained.

Sixth Exemplary Embodiment

A UL configuration corresponding to the third exemplary embodiment corresponds to a configuration in which functional units equivalent to Ack/Nack calculator 408 and transmitter 407 illustrated in FIG. 10 of the third exemplary embodiment are added in FH receiver 80 of master station device 11 illustrated in FIG. 15.

In a sixth exemplary embodiment, the UL configurations of master station processor 90 of master station device 11, secondary station processor 60 of secondary station device 12, and FH transmitter 70 may be the same as or similar to the configurations illustrated in FIGS. 16, 13, and 14, respectively.

In the sixth exemplary embodiment, for example, Ack/Nack statistical information for the UL signal is obtained by FH receiver 80. The Ack/Nack statistical information is transmitted to, for example, controller 807 of FH receiver 80 and FH quality calculator 904 of master station processor 90. As a result, the transmission parameters of a radio section and the FH transmission section of the UL are controlled based on the Ack/Nack statistical information.

As described above, the sixth exemplary embodiment allows an effect in the UL equivalent to the effect of the third exemplary embodiment to be obtained.

Others

In the first to sixth exemplary embodiments, the description has been made focusing a one-to-one connection relationship between master station device 11 and secondary station device 12. However, the connection relationship between master station device 11 and secondary station device 12 may be a one-to-many relationship.

When signals of different service types are multiplexed in FH transmitter 30 (or 70) and FH receiver 40 (or 80), the number of patterns of known signals for FH transmission quality measurement may correspond to the number of multiplexing (the number of service types). In this case, accuracy of FH transmission quality measurement for each service type can be expected to improve.

The notation "unit" used in the first to sixth exemplary embodiments may be replaced with another notation such as "circuit (circuitry)", "device", "unit", or "module" when the notation means a physical element. On the other hand, when the notation means a logical element, the notation "unit" may be replaced with, for example, "slice" as described above.

The term "functional split point" used in the first to sixth exemplary embodiments may be referred to as "split", "option", or "split option".

For example, the Common Public Radio Interface: eCPRI Interface Specification V2.0 (2019 May 10) specifies splits A to E. Further, examples of a "split option" include split options 1 to 8 described below as described in ITU-T G-series Recommendations—Supplement 66 (2018-October).

(1) Split option 1: Between radio resource control (RRC) and PDCP (2) Split option 2: Between PDCP and RLC (High-RLC)

(3) Split option 3: Between High-RLC and Low-RLC (4) Split option 4: Between RLC (Low-RLC) and MAC (High-MAC)

(5) Split option 5: Between High-MAC and Low-MAC
(6) Split option 6: Between MAC (Low-MAC) and PHY (High-PHY)
(7) Split option 7: Between High-PHY and Low-PHY
(8) Split option 8: Between PHY (Low-PHY) and RF As shown in the above split options 1 to 8, the RLC units and the MAC units may be functionally split (or classified) into high and low in the first to sixth exemplary embodiments.

The functional split configuration of master station signal processor 202 #1 and secondary station signal processor 502 #1 of the DL and the functional split configuration of master station signal processor 902 #1 and secondary station signal processor 603 #1 of the UL as exemplified in the first to sixth exemplary embodiments correspond to "split D" or "split option 7".

Meanwhile, the functional split configuration of master station signal processor 202 #2 and secondary station signal processor 502 #2 of the DL and the functional split configuration of master station signal processor 902 #2 and secondary station signal processor 603 #2 of the UL as exemplified in the first to sixth exemplary embodiments correspond to "split B" or "split option 2".

As the functional split configuration of master station signal processor (202/902) #j and secondary station signal processor (502/603) #j, any splits (or split options) may be adopted as long as the splits are a combination of different splits from splits A to E (or split options 1 to 8).

Note that any one of splits A to E (or split options 1 to 8) may be further split (or classified) as, for example, a "sub-split" (or "sub-option"). The "sub-split" (or "sub-option") may be included in combination candidates of different functional split configurations.

In the first to sixth exemplary embodiments, a case with one functional split point (two functional split configurations including master station device 11 and secondary station device 12) has been described, but there may be two or more functional split points. For example, the plurality of base station functional units may be split and disposed in three unit, which are CU, DU, and radio unit (RU), by two functional split points.

In this case, for example, a connection between the CU and the DU corresponds to FH 13. For example, the transmission quality (for example, the transmission parameter) between the CU and the DU and the transmission quality between the DU and the RU may be individually controlled based on the information indicating the transmission quality of FH 13 between the CU and the DU, such that the transmission quality of the integrated propagation path of CU-DU-RU meets a required quality transmission quality.

The present disclosure can be realized by software, hardware, or software linked with hardware. The functional blocks used for describing the exemplary embodiments are partially or wholly realized as a large-scale integration (LSI) as an integrated circuit. Each process described in the exemplary embodiments may be partially or wholly controlled by one LSI or a combination of LSIs. The LSI may be configured by individual chips, or may be configured by one chip so as to include some or all of the functional blocks. The LSI may include data input and output. The LSI may be referred to as an IC, a system LSI, a super LSI, or an ultra LSI depending on an integration degree.

A method of circuit integration is not limited to the LSI, and may be realized by a dedicated circuit, a general-purpose processor, or a dedicated processor. A field programmable gate array (FPGA) that can be programmed after the LSI is manufactured, or a reconfigurable processor that can reconfigure connection and setting of circuit cells inside the LSI may be used. The present disclosure may be implemented as digital processing or analog processing.

Further, if integrated circuit technology emerges to replace LSIs as a result of advancement of semiconductor technology or another derivative technology, the functional blocks may well be integrated using such a technology. An application of biotechnology or the like is possible.

Summary of the Present Disclosure

A master station device according to a non-limiting example of the present disclosure is connected to a secondary station device through a fronthaul, and the master station device includes: a first base station signal processor having a first functional split configuration relating to a plurality of base station functional units for a first service type; and a second base station signal processor having a second functional split configuration relating to the plurality of base station functional units for a second service type.

The master station device according to a non-limiting example of the present disclosure may include a controller configured to determine transmission schemes through the fronthaul, one of the transmission schemes for the first base station signal processor and another of the transmission schemes for the second base station signal processor being determined separately.

Further, in a non-limiting example of the present disclosure, the controller may be configured to determine the transmission schemes through the fronthaul and a radio transmission scheme for the secondary station device based on information indicating transmission quality of the fronthaul.

In a non-limiting example of the present disclosure, the information indicating the transmission quality of the fronthaul may be based on a result of measurement of quality of a known signal transmitted through the fronthaul, the known signal being a signal known between the master station device and the secondary station device.

In a non-limiting example of the present disclosure, the known signal may be configured to be transmitted from the secondary station device to the master station device through the fronthaul, and the master station device may further include a measurement unit configured to measure the quality of the known signal.

In a non-limiting example of the present disclosure, the known signal may be transmitted from the master station device to the secondary station device through the fronthaul, and the information indicating the transmission quality of the fronthaul may be feedback information of the result of the measurement of the quality of the known signal by the secondary station device.

In a non-limiting example of the present disclosure, the information indicating the transmission quality of the fronthaul may be based on an error determination result of data transmitted through the fronthaul.

In a non-limiting example of the present disclosure, the controller may be configured to determine the transmission schemes through the fronthaul and a radio transmission scheme for the secondary station device based on information on specified target quality.

A secondary station device according to a non-limiting example of the present disclosure is connected to a master station device through a fronthaul, and the secondary station device includes: a first base station signal processor having a first functional split configuration relating to a plurality of base station functional units for a first service type; and a second base station signal processor having a second functional split configuration relating to the plurality of base station functional units for a second service type.

The secondary station device according to a non-limiting example of the present disclosure may include transmitter configured to transmit a known signal to the master station device, the known signal being a signal known between the master station device and the secondary station device.

In one non-limiting example of the present disclosure, the secondary station device may be configured to feed back, to the master station device, a result of measurement, by the secondary station device, of quality of a known signal transmitted by the master station device, the known signal being a signal known between the master station device and the secondary station device.

A method of controlling communication according to a non-limiting example of the present disclosure is a method by a master station device connected to a secondary station device through a fronthaul, the method including: obtaining information indicating transmission quality of the fronthaul; and determining transmission schemes through the fronthaul based on the information indicating the transmission quality of the fronthaul, one of the transmission schemes for a first base station signal processor and another of the transmission schemes for a second base station signal processor being determined separately, the first base station signal processor having a first functional split configuration relating to a plurality of base station functional units for a first service type, the second base station signal processor having a second functional split configuration relating to the plurality of base station functional units for a second service type.

A method of controlling communication according to a non-limiting example of the present disclosure is a method by a secondary station device connected to a master station device through a fronthaul, the method including: transmitting a signal for the master station device to measure transmission quality of the fronthaul; and determining transmission schemes through the fronthaul based on the information indicating the transmission quality of the fronthaul, one of the transmission schemes for a first base station signal processor and another of the transmission schemes for a second base station signal processor being determined separately, the first base station signal processor having a first functional split configuration relating to a plurality of base station functional units for a first service type, the second base station signal processor having a second functional split configuration relating to the plurality of base station functional units for a second service type.

The present disclosure is suitable for, for example, a base station for radio communication.

What is claimed is:

1. A master station device connected to a secondary station device through a fronthaul, the master station device comprising:
    a first base station signal processor configured to perform a first group of one or more functional layers among a plurality of base station functional layers when a service type is a first service type, the first service type being one selected from a group including enhanced mobile broadband, ultra-reliable and low latency communications, and massive machine type communication; and
    a second base station signal processor configured to perform a second group of one or more functional layers among the plurality of base station functional layers when a service type is a second service type, the second group of one or more functional layers being different from the first group of one or more functional layers, the second service type being one selected from the group including the enhanced mobile broadband, the ultra-reliable and low latency communications, and the massive machine type communication, the second service type being different from the first service type.

2. The master station device according to claim 1, comprising a controller configured to determine transmission schemes through the fronthaul, one of the transmission schemes for the first base station signal processor and another of the transmission schemes for the second base station signal processor being determined separately.

3. The master station device according to claim 2, wherein the controller is configured to determine the transmission schemes through the fronthaul and a radio transmission scheme for the secondary station device based on information indicating transmission quality of the fronthaul.

4. The master station device according to claim 3, wherein the information indicating the transmission quality of the fronthaul is based on a result of measurement of quality of a known signal transmitted through the fronthaul, the known signal being a signal known between the master station device and the secondary station device.

5. The master station device according to claim 4, wherein
    the known signal is to be transmitted from the secondary station device to the master station device through the fronthaul, and
    the master station device further comprises a measurement unit configured to measure the quality of the known signal.

6. The master station device according to claim 4, wherein
    the known signal is to be transmitted from the master station device to the secondary station device through the fronthaul, and
    the information indicating the transmission quality of the fronthaul is feedback information of the result of the measurement of the quality of the known signal by the secondary station device.

7. The master station device according to claim 3, wherein the information indicating the transmission quality of the fronthaul is based on an error determination result of data transmitted through the fronthaul.

8. The master station device according to claim 2, wherein the controller is configured to determine the transmission schemes through the fronthaul and a radio transmission scheme for the secondary station device based on information on specified target quality.

9. A secondary station device connected to a master station device through a fronthaul, the secondary station device comprising:
    a first base station signal processor configured to perform a first group of one or more functional layers among a plurality of base station functional layers when a service type is a first service type, the first service type being one selected from a group including enhanced mobile broadband, ultra-reliable and low latency communications, and massive machine type communication; and
    a second base station signal processor configured to perform a second group of one or more functional layers among the plurality of base station functional layers when a service type is a second service type, the second group of one or more functional layers being different from the first group of one or more functional layers, the second service type being one selected from the group including the enhanced mobile broadband, the ultra-reliable and low latency communications, and the massive machine type communication, the second service type being different from the first service type.

10. The secondary station device according to claim 9, comprising a transmitter configured to transmit a known signal to the master station device, the known signal being a signal known between the master station device and the secondary station device.

11. The secondary station device according to claim 9, wherein the secondary station device is configured to feed back, to the master station device, a result of measurement, by the secondary station device, of quality of a known signal transmitted by the master station device, the known signal being a signal known between the master station device and the secondary station device.

12. A method of controlling communication by a master station device connected to a secondary station device through a fronthaul, the method comprising:
obtaining information indicating transmission quality of the fronthaul; and
determining transmission schemes through the fronthaul based on the information indicating the transmission quality of the fronthaul, one of the transmission schemes for a first base station signal processor and another of the transmission schemes for a second base station signal processor being determined separately, the first base station signal processor being configured to perform a first group of one or more functional layers among a plurality of base station functional layers when a service type is a first service type, the first service type being one selected from a group including enhanced mobile broadband, ultra-reliable and low latency communications, and massive machine type communication, the second base station signal processor being configured to perform a second group of one or more functional layers among the plurality of base station functional layers when a service type is a second service type, the second group of one or more functional layers being different from the first group of one or more functional layers, the second service type being one selected from the group including the enhanced mobile broadband, the ultra-reliable and low latency communications, and the massive machine type communication, the second service type being different from the first service type.

13. A method of controlling communication by a secondary station device connected to a master station device through a fronthaul, the method comprising:
transmitting a signal for the master station device to measure transmission quality of the fronthaul; and
determining transmission schemes through the fronthaul based on information indicating the transmission quality of the fronthaul, one of the transmission schemes for a first base station signal processor and another of the transmission schemes for a second base station signal processor being determined separately, the first base station signal processor being configured to perform a first group of one or more functional layers among a plurality of base station functional layers when a service type is a first service type, the first service type being one selected from a group including enhanced mobile broadband, ultra-reliable and low latency communications, and massive machine type communication, the second base station signal processor being configured to perform a second group of one or more functional layers among the plurality of base station functional layers when a service type is a second service type, the second group of one or more functional layers being different from the first group of one or more functional layers, the second service type being one selected from the group including the enhanced mobile broadband, the ultra-reliable and low latency communications, and the massive machine type communication, the second service type being different from the first service type.

* * * * *